United States Patent [19]

Engen et al.

[11] Patent Number: 5,611,825
[45] Date of Patent: Mar. 18, 1997

[54] ABRASIVE ARTICLES AND METHODS OF MAKING SAME

[75] Inventors: Robbyn L. Engen, River Falls, Wis.; Jeffrey E. Ford, Woodbury, Minn.

[73] Assignee: Minnesota Mining and Manufacturing Company, St. Paul, Minn.

[21] Appl. No.: 308,656

[22] Filed: Sep. 19, 1994

Related U.S. Application Data

[63] Continuation-in-part of Ser. No. 300,854, Sep. 2, 1994, Pat. No. 5,486,219, which is a continuation of Ser. No. 945,126, Sep. 15, 1992, abandoned.

[51] Int. Cl.$^6$ ........................................... B24D 3/02
[52] U.S. Cl. .................... 51/295; 51/294; 51/298; 51/304
[58] Field of Search ........................... 51/293, 294, 295, 51/298, 304

[56] References Cited

U.S. PATENT DOCUMENTS

| | | | |
|---|---|---|---|
| 1,355,834 | 10/1920 | John | 260/69 |
| 2,518,388 | 8/1950 | Simons | 154/459 |
| 2,958,593 | 11/1960 | Hoover et al. | 51/295 |
| 3,188,265 | 6/1965 | Charbonneau et al. | 428/420 |
| 3,781,172 | 12/1973 | Pett et al. | 51/309 |
| 3,849,949 | 11/1974 | Steinhauser et al. | 51/406 |
| 3,891,408 | 6/1975 | Rowse et al. | 51/295 |
| 3,933,274 | 1/1976 | Emmons et al. | 222/94 |
| 4,255,164 | 3/1981 | Butzke et al. | 51/295 |
| 4,386,943 | 6/1983 | Gümbel et al. | 51/298 |
| 4,505,720 | 3/1985 | Gabor et al. | 51/295 |
| 4,518,397 | 3/1985 | Leitheiser et al. | 51/293 |
| 4,563,388 | 1/1986 | Bonk et al. | 428/304.4 |
| 4,574,003 | 3/1986 | Gerk | 51/309 |
| 4,744,802 | 5/1988 | Schwabel | 51/309 |
| 4,748,043 | 5/1988 | Seaver et al. | 427/30 |
| 4,749,617 | 6/1988 | Canty | 428/332 |
| 4,761,441 | 8/1988 | Woodson | 523/439 |
| 4,770,671 | 9/1988 | Monroe et al. | 51/293 |
| 4,855,354 | 8/1989 | Mohler et al. | 525/54.24 |
| 4,881,951 | 11/1989 | Wood et al. | 51/309 |
| 4,903,440 | 2/1990 | Larson et al. | 51/298 |
| 4,906,523 | 3/1990 | Bilkadi et al. | 428/327 |
| 4,933,234 | 6/1990 | Kobe et al. | 428/336 |
| 4,939,008 | 7/1990 | Kemski | 428/34.3 |
| 5,061,294 | 10/1991 | Harmer et al. | 51/295 |
| 5,093,759 | 3/1992 | Davis et al. | 361/721 |

FOREIGN PATENT DOCUMENTS

| | | |
|---|---|---|
| 0501174A1 | 9/1992 | European Pat. Off. . |
| 2203847 | 7/1990 | France . |
| 0419812 | 11/1934 | United Kingdom . |
| 1510781 | 5/1978 | United Kingdom . |
| 92/01018 | 1/1992 | WIPO . |
| WO94/06839 | 3/1994 | WIPO . |

OTHER PUBLICATIONS

Bordon Chemical Technical Brochure entitled, "Durite Abrasive Binder A18405".
Russion Author's Certificate No.: 738745, published Jun. 5, 1980.
B. Meyer, "Urea Formaldehyde Resins," Addison–Wesley Publishers, Boston 1979.
Ebewele et al., *J. of Applied Polymer Science*, vol. 42, p. 2997 (1991).
Watson et al., *A Differential Scanning Calorimeter for Quantative Differential Thermal Analysis*, Anal. Chem., vol. 36, No. 4, pp. 1233–1238 (Jun. 1964).
Borden Trade Lit for AL–3029R, Durite Urea–Formaldehyde Resin, Dated Nov. 1993.
Derwent Publications Ltd., London, GB; English Abstract of JP 56 069 074, Jun. 10, 1981.
Derwent Publications Ltd., London, GB; English Abstract of JP 50 088 137, Jul. 15, 1975.
Patent Abstracts of Japan; English Abstract of JP 05 222 356, Aug. 31, 1993.

*Primary Examiner*—Deborah Jones
*Attorney, Agent, or Firm*—Gary L. Griswold; Walter N. Kirn; Doreen S. L. Gwin

[57] ABSTRACT

Film-backed and paper-backed coated abrasives and methods of making same are described using coatable urea-aldehyde binder precursor compositions including a urea-aldehyde resin and a cocatalyst, which yield more consistent quality coated abrasives. In addition, the compositions have longer pot life and allow curing at lower temperatures. The urea-aldehyde resins have an aldehyde/urea molar ratio of at least about 1.0, more preferably ranging from about 1.0 to about 2.0, and a free aldehyde content ranging from about 0.1 to about 3.0 weight percent based on weight of total aldehyde. The cocatalyst consists essentially of a Lewis acid and a salt selected from the group consisting of ammonium ion salts and organic amine salts. Paper-backed abrasive articles may employ a fabric nonwoven layer between the abrasive coating and the paper layer to reduce abrasive particle shelling.

64 Claims, 2 Drawing Sheets

ABRASIVE ARTICLES AND METHODS OF MAKING SAME

CROSS REFERENCE TO RELATED APPLICATION

This application is a continuation-in-part of assignee's Ser. No. 08/300,854, filed Sep. 2, 1994, now U.S. Pat. No. 5,406,219, which was a file wrapper continuation of Ser. No. 07/945,126, filed Sep. 15, 1992, abandoned.

BACKGROUND OF THE INVENTION

1. Field of the Invention

The present invention relates to coatable urea-aldehyde binder precursor compositions having low free aldehyde content which are catalyzed to cured binders by a cocatalyst. The catalyst is described as a "cocatalyst" because it has two components: an ammonium salt (such as ammonium chloride, ammonium nitrate, ammonium thiocyanate, and the like) and a Lewis acid (such as aluminum chloride, ferric chloride, and the like). The cocatalyst is especially useful in the production of coated abrasive articles.

2. Discussion of Related Art

Generally, coated abrasives comprise a backing onto which a plurality of abrasive particles are bonded thereto. In one major form of the coated abrasive, the abrasive particles are secured to the backing by means of a first binder coat, called a make coating, which is adhered to the backing. Abrasive particles are applied while the make coating is in its uncured state, followed by precure of the make coating. Over the make coating abrasive particles is applied a second binder coat, commonly called a size coating. The purpose of the size coating is to reinforce the abrasive particles.

In a second major form of coated abrasive, the abrasive particles are dispersed in a binder to form an abrasive composite, and this abrasive composite is bonded to the backing by means of the binder. Coated abrasives are used in a variety of different applications from gate removal on forged metal parts to finishing eye glasses. Additionally, coated abrasives are converted into a wide variety of different forms including endless belts, sheets, cones, discs, and the like.

Examples of popular coated abrasive backings include paper, nonwoven webs, cloth, vulcanized fiber, polymeric film and treated versions thereof, and combinations thereof. The polymeric film, especially polyester film, has found wide commercial success in fine grade abrasives, i.e., the fine particle size of the abrasive particles. These fine grades are those in which the average particle size of the abrasive particle is less than about 150 micrometers, typically less than 100 micrometers. Polymeric film is consistently very flat and smooth, thus it does not have surface roughness like the other fibrous backings. This flatness and smoothness results in most, if not all, of the abrasive particles being substantially in one plane, and thus substantially all of the abrasive particles are able to contact the workpiece being abraded and typically a higher cut rate results. If the coated abrasive backing is rough, especially in the fine grades, the tendency is that not all of the abrasive particles will be in one plane and thus not contacting the workpiece at the same time. This in turn leads to a coarser surface finish and a lower rate of cut.

However, one problem associated with the smooth polymeric films is the adhesion of binders to that type of surface, in particular urea-aldehyde binders. Primers are routinely utilized on the front surface of the polymeric film to increase the adhesion of the make coating. Examples of primers include mechanical and chemical primers. It is one object of the present invention to provide improved coated abrasives of the type having a polymeric film backing having coated thereon an abrasive coating comprising a urea-aldehyde binder.

The use of acid/base reactions to control the addition and condensation reactions of urea-formaldehyde (UF) dates back to the 1918 work of Hanns John. It is generally accepted that a nucleophilic component is necessary for an amino-carbonyl condensation via reactions 1–3 (all aqueous):

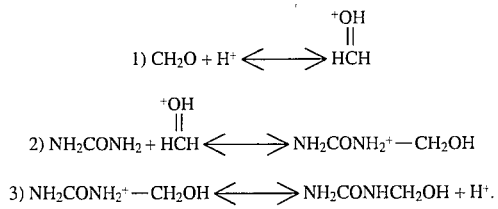

Although the addition reaction (reaction 2) is both acid and base catalyzed, the condensation reaction (reaction 4) is exclusively acid catalyzed:

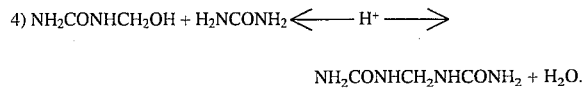

$$NH_2CONHCH_2NHCONH_2 + H_2O.$$

The nucleophilic component necessary for amino-carbonyl condensations can be provided by any of a variety of proton donors. The most common classes are mineral acids, OH—acidic compounds, acidic SH, NH and CH moieties, and some olefins.

UF was first patented for use as an adhesive for coated abrasives by Minnesota Mining and Manufacturing Company ("3M") in the mid 1930's (Great Britain Pat. No. 419,812). Since that time a number of different coated abrasive products have been made with acid catalyzed UF resins. Today, the two most common catalysts used with UF resins are aluminum chloride ($AlCl_3$) and ammonium chloride ($NH_4Cl$).

Although urea-aldehyde resins have enjoyed great success in coated abrasives, the need to reduce the use of solvents and unreacted reactants which contribute to release of volatile organic hydrocarbons (VOC) in the process of making coated abrasives, and the need to increase the quality of the abrasives while maintaining or increasing their level of performance is challenging the industry.

Meanwhile, the appearance to the user of the coated abrasive is important. It has been interestingly found that, when attempting to increase the abrading performance of coated abrasives made using urea-aldehyde resins when aluminum chloride is used alone as the catalyst, a higher temperature than normal must be used to cure the urea-aldehyde resin, which in turn leads to curling of edges of paper-backed coated abrasives. (The use of aluminum chloride as a catalyst for urea-formaldehyde resins in the making of coated abrasive articles is known.) Therefore, it would be advantageous if the abrading performance of paper-backed coated abrasives made using urea-aldehyde resins could be increased without sacrificing the appearance or increasing the waste of coated abrasive.

When the $AlCl_3$ catalyst is used alone, the gel time, pot life and peak exotherm temperatures are all dependent on the concentration of the AlCl₃. Thus, the performance of the coated abrasive is dependent upon the concentration of the AlCl₃, and the cure conditions (time and temperature).

In order to achieve a good performing product using factory cure conditions (i.e temperature ranging from about 65° C. to about 95° C.), the concentration of AlCl₃ should be near 1 weight percent, based on weight of binder precursor. The drawback with a 1 weight percent concentration of AlCl₃ is that the pot-life may be too short for batch operations typically used in the factory with urea-aldehyde resins having low (about 0.1 to about 1.0 weight percent) free aldehyde content, based on total weight of aldehyde.

When NH₄Cl is used alone as the catalyst, the gel time, pot life and peak exotherm temperatures are all independent of the NH₄Cl concentration, affording an advantage over the use of a Lewis acid catalyst. However, the activity (ability of the catalyst to catalyze the reaction) of the NH₄Cl was dependent on the free formaldehyde concentration in the binder precursor composition due to the following reaction:

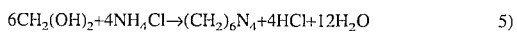

6CH₂(OH)₂+4NH₄Cl→(CH₂)₆N₄+4HCl+12H₂O   5)

With low free aldehyde resins, such as that known under the trade designation "AL3029R", from Borden Chemical, the NH₄Cl does not activate the condensation reaction (4) very readily until the temperature of the reaction is increased above that normally used. However, as mentioned above, increased temperature tends to curl the edges of paper-backed coated abrasives and without performance improvements. The performance of the coated abrasive is independent of the NH₄Cl concentration. Thus, the drawbacks of this system are the long gel times, and only moderate performance levels are obtained with typical factory cure conditions.

Therefore, it would be an advance in the art to provide a binder precursor composition (preferably a solution or dispersion) which includes a urea-aldehyde resin and cocatalyst system and coated abrasives which meet these needs. It is the primary object of the present invention to provide such compositions which will, when cured, provide a coated abrasive binder having uniformity of physical properties as is previously known, but which also allow higher production runs of coated abrasives without curling of the edges of the coated abrasive web and increased abrasion performance.

SUMMARY OF THE INVENTION

In accordance with the present invention, coated abrasives of the type comprising a backing coated on at least one major surface thereof with an abrasive coating are presented. The abrasive coating comprises a binder and abrasive particles. The binder is comprised of a solidified urea-aldehyde resin, the solidified urea-aldehyde resin derived from a binder precursor comprising a urea-aldehyde resin having a low free aldehyde content and a cocatalyst. In one aspect of the invention, it is preferred to further include a latex in the binder precursor. It has been found quite unexpectedly that the addition of the latex significantly improves adhesion of the binder precursor, and thus the binder, to a polymeric film backing.

In a first preferred embodiment, the coated abrasive comprises:

(1) a backing comprising a polymeric film, the polymeric film having a front and back surface, the polymeric film having a primer on the front surface;

(2) an abrasive coating bonded to the front surface of the polymeric film, the abrasive coating comprising a plurality of abrasive particles dispersed in a binder, the binder comprising a major portion of a solidified urea-aldehyde resin and a minor portion of a second component, the second component being a solids portion of a latex (preferably an ethylene-vinyl acetate ("EVA") copolymer).

The solidified urea-aldehyde resin of the abrasive coating is preferably derived from a non-solidified urea-aldehyde resin having a low free aldehyde content and a cocatalyst.

A second preferred coated abrasive embodiment of the invention comprises:

(1) a backing comprising a polymeric film, the polymeric film having a front and back surface, the polymeric film having a primer on the front surface;

(2) an abrasive coating bonded to the front surface of the polymeric film, the abrasive coating comprising:
   (a) a plurality of abrasive particles bonded to the front surface of the polymeric film by a make coating binder comprising a major portion of a first solidified urea-aldehyde resin and a minor portion of a second component, the second component being a solids portion of a latex (preferably an EVA copolymer); and
   (b) a size coating binder overlaying the abrasive particles and the make coating binder, the size coating binder comprising a second solidified resin.

Preferably at least one of the first and second (or both) solidified urea-aldehyde resins is derived from a non-solidified urea-aldehyde resin having a low aldehyde content and a cocatalyst. Urea-aldehyde resins having these characteristics exhibit improved pot-life (relative to urea-aldehyde resins catalyzed solely by a Lewis acid or solely by an ammonium ion salt) while maintaining or increasing the reactivity of the resin. The second solidified resin may be a solidified phenolic resin, urea-formaldehyde resin, melamine-formaldehyde resin, and the like.

More particularly, preferred coatable urea-aldehyde binder precursor compositions comprise a non-solidified urea-aldehyde resin having low free aldehyde weight percent and a cocatalyst, the urea-aldehyde resin having an aldehyde/urea molar ratio of at least about 1.0:1.0, more preferably ranging from about 1.0:1.0 to about 2.0:1.0. As used herein the term "low free aldehyde" means the free aldehyde ranges from about 0.1 to about 3.0 weight percent, more preferably ranging from about 0.1 to about 1.0 weight percent, based on weight of original aldehyde in the resin. "Free aldehyde" as used herein means that weight percent of the total weight of aldehyde that is not reacted with urea.

The term "cocatalyst" means a catalyst consisting essentially of a Lewis acid, preferably aluminum chloride (AlCl₃), and an organic amine salt or an ammonium salt. If an ammonium ion salt is used it is preferably ammonium chloride (NH₄Cl). Mixtures of inorganic and organic salts are typically, and in some cases, preferably utilized.

The urea-aldehyde resins useful in the invention may be "modified" or "unmodified" as those terms are known and used in the art. The term "modified" is meant to denote that the urea is modified by reaction with furfuryl alcohol and/or melamine prior to or during the reaction with the aldehyde.

The front surface of the polymeric film in both first and second embodiments is primed to increase the adhesion of the abrasive coating thereto. Examples of suitable primers include mechanical and chemical primers, as further described herein.

Third and fourth coated abrasive article embodiments of the invention are those wherein the backing is paper. In embodiments where paper backings are employed, it is preferred to use paper having a latex barrier primer coating to prevent the make coating precursors from excessively penetrating into the paper.

The third and fourth embodiments are similar to the first and second embodiments, respectively, but with the following optional changes. In the third embodiment, which comprises an abrasive coating on a paper backing, no solids portion of a latex is required, although the solids portion of a latex could be incorporated if so desired. In the fourth embodiment, which is a make/size construction, at least one of the make and size coating binders comprises major portion of a solidified urea-aldehyde resin, the solidified urea-aldehyde resin being a polymerized non-solidified urea-aldehyde resin having low free aldehyde content, a cocatalyst, and a minor portion of a second component being a solids portion of a latex.

In paper-backed coated abrasives of the invention, in some embodiments it is preferred to use a laminate of a paper layer and a fabric-like nonwoven material, such as a nonwoven comprising 80 percent polyester/20 percent cellulose, wherein the fabric nonwoven is positioned between the abrasive coating and the paper, the fabric nonwoven being adhered to the paper with an adhesive, as further disclosed herein. The nonwoven fabric functions to reduce shelling of the abrasive particles from paper backings.

Polymeric film and paper are preferred backings for use in coated abrasives of the invention. Coated abrasives of these types are particularly adept in removing paint, paint primers, and the like, from metal substrates, as illustrated in the examples.

Methods of making a coated abrasives having a plurality of abrasive particles secured either to a polymeric film backing or a paper backing by a binder comprising a solidified urea-aldehyde resin are also presented, as well as products produced by the methods. One preferred method for polymeric film backings comprises the steps of:

(1) providing a polymeric film having a front and a back surface, the film having a primer on the front surface;

(2) providing a coatable make coating binder precursor composition comprising a major portion of a first non-solidified urea-aldehyde resin and a minor portion of a second component, the second component being a solids portion of a latex (preferably an EVA copolymer);

(3) coating the make coating binder precursor composition onto the front surface of the polymeric film to form a wet make coated backing;

(4) applying a plurality of abrasive particles to the wet make coated backing to form a first intermediate product having a surface substantially covered with the abrasive particles;

(5) exposing the first intermediate product of step (4) to an energy source sufficient to form a first at least partially solidified urea-aldehyde resin;

(6) coating over the abrasive particles and the first at least partially solidified urea-aldehyde resin with a coatable size coating binder precursor composition comprising a second non-solidified thermosetting resin to form a second intermediate product; and (7) exposing the second intermediate product to an energy source sufficient to solidify the first and second resins, wherein at least one of the first and second non-solidified resins, or both, are low free aldehyde resins containing a cocatalyst.

Preferred methods when the backing is polymeric film are those wherein the make coating binder precursor composition comprises a low free formaldehyde urea-formaldehyde resin, a cocatalyst, and a latex, and the size coating binder precursor composition comprises a low free formaldehyde urea-formaldehyde resin and a cocatalyst.

Methods useful when the backing is paper, are similar to that just described for polymeric film backings except that at least one of the make and size coating binder precursors comprises major portion of a non-solidified urea-aldehyde resin having low free aldehyde content and a cocatalyst. Both the first and second non-solidified resins of the make and size binder precursor compositions are preferably derived from a non-solidified urea-aldehyde resin having low free aldehyde content and a cocatalyst.

An alternative method comprises the steps of:

(1) providing a coatable slurry comprising abrasive particles and a binder precursor composition, the binder precursor composition comprising a major portion of a non-solidified urea-aldehyde resin (having low free aldehyde content and a cocatalyst when paper backings are used), and a minor portion of a latex (when polymeric film backings are used);

(2) coating the slurry onto a backing to form a wet coated backing; and (3) exposing the wet coated backing to an energy source sufficient to at least partially solidify the binder precursor composition.

Nonwoven abrasives in the form of an open, lofty, three-dimensional web of fibers bonded together at a plurality of points where the fibers contact each other by a solidified urea-aldehyde binder are also considered within the scope of the invention, wherein the solidified urea-aldehyde resin is derived from a low free urea-aldehyde resin and a cocatalyst. The binder may also serve to adhere abrasive particles to the fibers of the web. The nonwoven abrasives are to be distinguished from the fabric nonwovens mentioned herein useful as laminates with paper. A "nonwoven abrasive" is lofty, open, whereas the nonwovens used in backings are not.

The low free aldehyde urea-aldehyde binder precursor compositions containing a cocatalyst which are useful and preferred in the invention exhibit adequate pot-life, reduced gel time, and increased resin reactivity which results in reasonable cure conditions. The result is a coatable urea-aldehyde binder precursor composition having a controlled cure that improves the performance and appearance of the inventive abrasive products, particularly paper-backed coated abrasives. Other features and advantages of the invention will be revealed by the description which follows.

DESCRIPTION OF PREFERRED EMBODIMENTS

Figure 1:
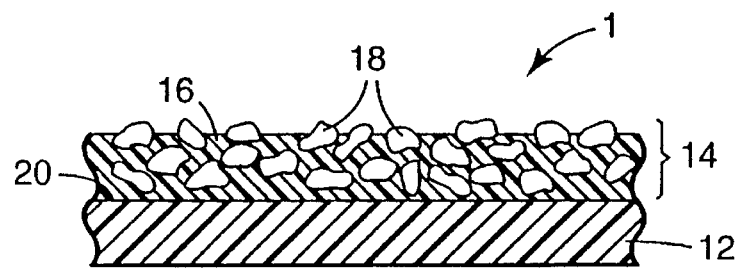
FIGS. 1–5 represent enlarged cross-sectional views of coated abrasive articles within the invention.

The term "coatable", as used herein, means that binder precursor compositions useful in the invention may be easily coated or sprayed onto substrates using coating devices which are conventional in the abrasives art, such as knife coaters, roll coaters, flow-bar coaters, electrospray coaters, spray coaters, and the like. This characteristic may also be expressed in terms of viscosity of the binder precursor compositions. The viscosity of the coatable binder precursor compositions should not exceed about 2000 centipoise (cps), measured using a Brookfield viscometer, number 3 spindle, 30 rpm, at room temperature (about 25° C.). More preferably, the viscosity should range from about 70 to about 900 cps. As used herein, the term "coatable binder precursor composition" means a coatable, homogeneous mixture including uncured urea-aldehyde resin, cocatalyst and water, which, upon curing, becomes a binder. The term "binder" means a cured binder.

The term "percent solids" means the weight percent organic material that would remain upon application of curing conditions. Percent solids below about 30% are not practical to use because of VOC emissions, while above about 95% solids the binder precursor compositions are difficult to render coatable, even when heated.

It is important to note that the reactivity and cure of urea-aldehyde resins are dependent on the aldehyde/urea ratio of the resin, type of catalyst, catalyst concentration, pH (defined as negative base ten logarithm of the hydrogen ion concentration) of the binder precursor compositions after addition of other additives, and the time and temperature used for curing. As mentioned previously, another important factor appears to be the amount of "free" aldehyde. As urea-aldehyde resins currently preferred for use in coatable compositions typically have low free aldehyde content for environmental purposes, a need has arisen for an improved catalyst that will work well with this type of resin.

Cocatalyst Systems

Lewis Acid Component

Binder precursor compositions useful in the invention preferably employ a cocatalyst system. The cocatalyst consists essentially of a Lewis acid, preferably aluminum chloride ($AlCl_3$), and an organic or inorganic salt. A Lewis acid catalyst is defined simply as a compound which accepts an electron pair, and preferably has an aqueous solubility at 15° C. of at least about 50 grams/100 cc.

Preferred are those Lewis acids (or compounds which behave as Lewis acids) selected from the group consisting of aluminum chloride, iron (III) chloride, and copper (II) chloride. Particularly preferred is the Lewis acid aluminum chloride in either its non-hydrated form ($AlCl_3$) or hexahydrate form ($AlCl_3 \bullet 6H_2O$).

The Lewis acid is typically and preferably used in the binder precursor solutions at an amount ranging from about 0.1 to about 5.0 weight percent of the total weight of binder precursor, as a 20–30 % solids aqueous solution. If aluminum chloride ($AlCl_3$) is used, it has been found that 0.6 weight percent of a 28% solids aqueous solution of $AlCl_3$ gives excellent results.

Salt Component

Ammonium Ion Salts

Cocatalysts useful in the invention consist essentially of a Lewis acid, preferably aluminum chloride ($AlCl_3$), and an aqueous organic amine salt or an ammonium ion salt. If an ammonium ion salt is used it is preferably a salt of ammonium ion ($NH_4^+$) and a halide ion such as chloride ion ($Cl^-$), fluoride ion ($F^-$), bromide ion ($Br^-$), and the like. A particularly preferred ammonium ion salt is ammonium chloride ($NH_4Cl$). Binder precursors in accordance with the invention preferably employ an ammonium ion salt having an aqueous solubility at 0° C. of at least about 20 grams/100 cc.

Ammonium sulfate (($NH_4)_2SO_4$), ammonium peroxydisulfate (($NH_4)_2S_2O_8$), ammonium thiosulfate (($NH_4)_2S_2O_3$), and ammonium nitrate ($NH_4NO_3$) are deemed suitable for use in the invention as useful ammonium ion salts when used specifically in combination with $AlCl_3$ as cocatalyst. In particular, although the cocatalyst $AlCl_3/(NH_4)_2SO_4$ showed little improvement compared with use of $AlCl_3$ as catalyst alone in terms of coated abrasive performance, it was surprisingly found that a coated abrasive made using this cocatalyst did not diminish performance.

The weight ratio of Lewis acid to ammonium ion salt typically and preferably ranges from about 0.6:1 to about 0.15:1 on a dry weight basis.

Ammonium ion salts are used in the binder precursor compositions of the invention at an amount ranging from about 0.5 to about 5.0 weight percent of the total solids weight of the composition, as a 20–30 weight percent solids aqueous solution. If ammonium chloride is used as the ammonium ion salt as preferred, it has been found that 2.0 weight percent (as a percentage of total weight of solids) of a 25 weight percent solids aqueous solution gives excellent results.

Organic Amine Salts

It may be desirable to use as the salt component a linear or branched chain organic amine salt of the type having a plurality of methylene units separating terminal amine groups. Organic amine salts render flexibility to the finished abrasive articles of the invention. Preferred linear organic amine salts are those selected from the group of compounds having the general formula

wherein X and Y are halide atoms that may be the same or different and n is an integer ranging from about 3 to about 10. An example of such a linear organic amine salt found useful by the inventors herein is the dichloride salt of hexamethylene diamine, obtained by the acidification of an aqueous solution of hexamethylene diamine with hydrochloric acid (HCl). One branched chain organic amine salt found useful is that known under the trade designation "Dytek-A", available from du Pont, which is commonly known as 2-methyl-pentamethylene diamine.

Mixtures of ammonium ion salts and organic amine salts are typically, and in some cases, preferably utilized in the binder precursor compositions. For example, the salt component of the cocatalyst may be comprised of 50 percent ammonium chloride, 50 percent dichloride salt of hexamethylene diamine, on a weight basis.

Urea-aldehyde Resins

Urea-aldehyde resins employed in the coatable binder precursor compositions useful in the invention may be comprised of urea or any urea derivative and any aldehyde which are capable of being rendered coatable, have the capability of reacting together at an accelerated rate in the presence of a cocatalyst, and which afford an abrasive article with abrading performance acceptable for the intended use. The resins comprise the reaction product of an aldehyde and a "urea" (as further defined herein). Urea-formaldehyde resins are preferred in the abrasive industry, as noted above, because of their thermal properties, availability, low cost, and ease of handling. The urea-aldehyde resins preferably are 30–95% solids, more preferably 60–80% solids, with a viscosity ranging from about 125 to about 1500 cps (Brookfield viscometer, number 3 spindle, 30 rpm, 25° C.) before addition of water and catalyst and have molecular weight (number average) of at least about 200, preferably varying from about 200 to 700.

A particularly preferred urea-aldehyde resin for use in the present invention is that known under the trade designation "AL3029R" from Borden Chemical This is an unmodified (i.e. contains no furfural) urea-formaldehyde resin, 65% solids viscosity (Brookfield, #3 spindle, 30 rpm, 25° C.) of 325 cps, a free formaldehyde content of 0.1–0.5 weight percent, and a molar ratio of formaldehyde to urea ("F/U ratio") of ranging from about 1.4:1.0 to about 1.6:1.0.

Preferred and particularly preferred ranges for ingredients of useful binder precursor compositions employing the urea-formaldehyde resin known under the trade designation "AL3029R" for producing paper-backed coated abrasives are shown in Table A.

TABLE A

Paper-Backed Coated Abrasives
Preferred binder precursor formulations
including the cocatalyst system, in weight percent

|  | Preferred | More Preferred |
|---|---|---|
| AL3029R (65% solids) | 70–95 | 80–95 |
| H$_2$O | 5–10 | 7–8 |
| NH$_4$Cl (25% solids) | 3–6 | 4–5 |
| AlCl$_3$ (28% solids) | 0.1–1.0 | 0.5–0.7 |

Aldehydes

Aldehydes which are useful in the invention include cyclic and normal and branched chain alkyl and alkylene aldehydes, and aromatic aldehydes. Preferably, the aldehydes have molecular weight below about 300 to afford a less viscous binder precursor composition. Examples of suitable aldehydes include formaldehyde, benzaldehyde, propanol, hexanal, cyclohexane carboxaldehyde, acetaldehyde, butyraldehyde, valeraldehyde, and other low molecular weight aldehydes. Preferred is formaldehyde, for its availability, low cost, cured resin properties, and because it affords low viscosity binder precursor compositions.

Ureas, Urea derivatives, and Thioureas

"Urea" as used in accordance with the invention is not limited to urea (H$_2$NCONH$_2$), but is meant to include straight and branched chain urea derivatives and cyclic urea derivatives, as well as thioureas. Urea-derivatives useful in the invention preferably have at least one functional group which is reactive with the aldehyde. Although urea is preferred for use in the coatable binder precursor compositions due to its aforesaid advantages in abrasive articles, it is sometimes advantageous to substitute a urea derivative for a portion of the urea to modify physical properties of the resultant abrasive article and/or to reduce emissions of VOC (such as unreacted free aldehyde). Useful urea derivatives may be selected from the group consisting of compounds represented by the general formula:

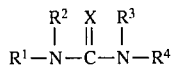

(I)

and mixtures thereof wherein X is either O or S, each of $R^1$, $R^2$, $R^3$, and $R^4$ is a monovalent radical selected from the group consisting of hydrogen, alkyl groups having 1 to about 10 carbon atoms, hydroxyalkyl groups having from about 2 to 4 carbon atoms and one or more hydroxyl groups, and hydroxypolyalkyleneoxy groups having one or more hydroxyl groups, and with the provisos that:

(1) said compound contains at least one —NH and one —OH group or at least two —OH groups or at least two —NH groups;

(2) $R^1$ and $R^2$ or $R^1$ and $R^3$ can be linked to form a ring structure; and (3) $R^1$, $R^2$, $R^3$, and $R^4$ are never all hydrogen at the same time.

Preferred urea derivatives, if used, include those wherein $R^1$ is 2-hydroxyethyl, $R^2$ and $R^3$ are linked to form an ethylene bridge, and $R^4$ is hydrogen, which forms hydroxyethyl ethylene urea or HEEU. Other representative urea derivatives within the general formula include N-2-hydroxyethyl-N'-butyl urea, N,N'-bis-(2-hydroxyethyl)-N'-butyl urea, and N,N'-bis(2hydroxyethyl)urea. Other urea derivatives useful in the present invention are listed in column 7 of U.S. Pat. No. 5,039,759, which is incorporated herein by reference. HEEU is available under the trade designation "UCAR RD-65-2", from Union Carbide Corporation.

Representative examples of thioureas which are useful in the practice of the present invention are thiourea compounds represented by general formula (I) above only wherein X=S.

Preparation of the above mentioned ureas and thioureas proceeds by methods known in the art. For example, preparation of N-(2-hydroxyethyl)-N, N'-ethylene urea may proceed by reacting equimolar mixtures of amino ethyl ethanolamine and dimethyl carbamate in a nitrogen purged vessel with heating (about 80° C.). The mixture is stirred for about three hours before being allowed to stand overnight. The mixture is then heated again while recovering methanol and other volatile materials up to about 195° C. The material remaining in the vessel is then subject to vacuum distillation, producing a distillate of the urea. Details on preparing this and other ureas are disclosed in U.S. Pat. No. 5,039,759, columns, 9–13, which are incorporated herein by reference.

Optional Ingredients

Typically and preferably, a solvent is added as needed to render the binder precursor compositions useful in the invention coatable. The solvent is preferably water, but those skilled in the art will realize with minimal experimentation that an organic solvent may be necessary, depending on the coating method, aldehyde, urea derivative, and the like. When water is used solely as the solvent it is preferably added up to the water tolerance of the binder precursor solution, although this is not necessary to render the compositions coatable. A water tolerance greater than about 100% is preferred, greater than about 150% especially preferred. ("Water tolerance" is defined as the measurement of the maximum weight percent of distilled water, based on initial resin weight, which can be added to a stirred, uncured resin via titration to begin causing visual phase separation (as evidenced by milky appearance) of the resin/water mixture into aqueous and organic phases.)

Coatable binder precursor compositions useful in the present invention can contain fillers, fibers, lubricants, grinding aids, antistatic agents, wetting agents, and other additives such as surfactants, pigments, dyes, coupling agents, plasticizers, and suspending agents. The amounts of these materials are selected to give the properties desired. Alternatively, useful binder precursor compositions may be formulated without these additives, and the additives mixed into the binder precursor just prior to coating onto a substrate.

Fillers are frequently used in abrasive articles to reduce cost and improve dimensional stability and other physical characteristics. Fillers can be selected from any filler material that does not adversely affect the rheological characteristics of the binder precursors or the abrading performance of the resulting abrasive article. Preferred fillers include calcium metasilicate, aluminum sulfate, alumina trihydrate, cryolite, magnesia, kaolin, quartz, and glass. Fillers that function as grinding aids are cryolite, potassium fluoroborate, feldspar, and sulfur. Fillers can be used in varying amounts limited only by the proviso that the abrasive article retains acceptable mechanical properties (such as flexibility and toughness).

Abrasive Articles

Coated abrasive articles of the invention may be produced by incorporating cured versions of the coatable binder precursor compositions described above. The backing may either be a polymeric film, paper sheet, or laminate of paper sheet and fabric nonwoven. Open, lofty nonwovens (to be distinguished from fabric nonwovens) of the type described in U.S. Pat. No. 2,958,593 may also utilize the cured versions of the binder precursors having low free aldehyde and a cocatalyst.

Figure 2:
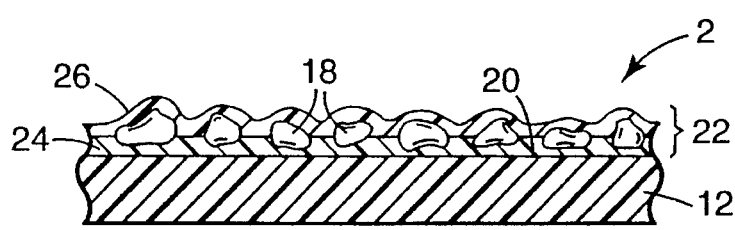
Figure 3:
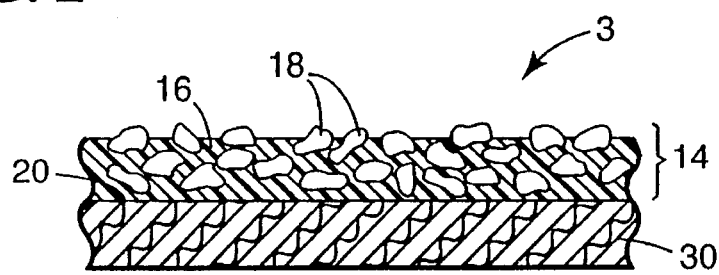
Figure 4:
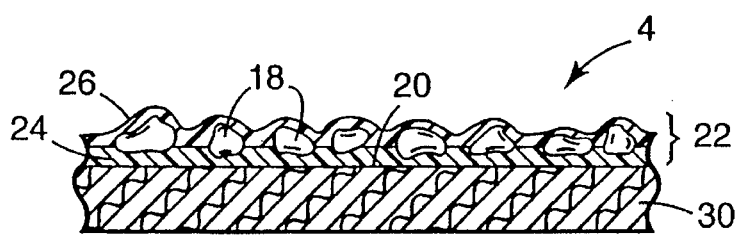
Figure 5:
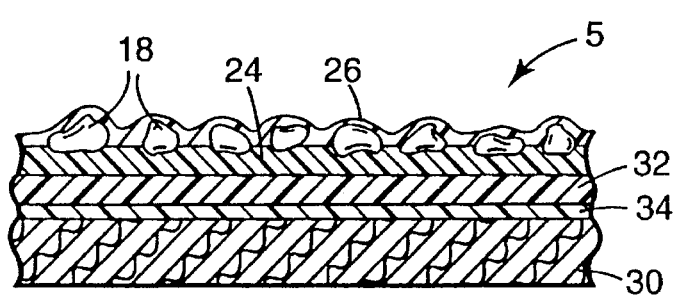

Referring now to the figures, FIGS. 1–5 illustrate in enlarged cross-section four preferred abrasive articles of the invention. FIGS. 1 and 2 illustrate use of polymeric film backings, while FIGS. 3, 4 and 5 illustrate articles employing paper backings.

FIG. 1 illustrates embodiment 1 as comprising polymeric film backing 12 having an abrasive coating 14 thereon (on one major surface of backing 12). Abrasive coating 14 comprises a binder 16, comprising a major portion of a solidified urea-aldehyde resin, and a plurality of abrasive particles 18 dispersed therein, preferably uniformly dispersed. Binder 16 also includes the solid remnants of a latex such as an EVA copolymer. A primer 20 is also illustrated, simply as a thin coating of aziridine or other chemical primer. Of course, primer 20 could be other chemical or physical modifications of polymeric film 12.

The embodiment 3 illustrated in FIG. 3 is similar to the embodiment illustrated in FIG. 1 except that backing 30 is paper rather than polymeric film. In this embodiment, binder 16 is preferably devoid of the solid remnants of a latex.

FIG. 2 illustrates in cross-section an embodiment 2, also having a polymeric film backing 12. Embodiment 2 has an abrasive coating 22 comprised of make coating binder 24 and size coating binder 26. Abrasive particles 18 are partially embedded in make coating binder 24, which includes a urea-aldehyde resin as a major portion and a minor portion of a solids remnant of a latex, such as an EVA copolymer. Abrasive particles 18 are further anchored by size coating binder 26. Also illustrated is primer 20, which may be chemical or mechanical.

The embodiment 4 illustrated in FIG. 4 is similar to embodiment 2 except that a paper backing 30 is employed, rather than polymeric film. In general, paper backings do not require a primer; however, paper backings may contain some type of treatment to seal the paper.

FIG. 5 illustrates a preferred embodiment 5 to reduce shelling from paper-backed coated abrasives of the invention. Embodiment 5 consists of paper layer 30, adhesively bonded to a fabric nonwoven layer 32. Adhesive 34 is preferably a thermoplastic material, such as a polyolefin film. One useful polyolefin film is that known under the trade designation "NA-206" from Quantum Chemical Co., which is a low density polyethylene. Adhesive 34 can be thermosetting or thermoplastic. The remainder of embodiment 5 is similar to embodiment 4, with make coating 24, size coating 26, and abrasive particles 18. The function fabric nonwoven 32 is to reduce shelling, that is, unwanted removal of abrasive particles from the coated abrasives of the invention during grinding.

A large variety of fabric nonwovens may be employed, such as those derived from polyester fibers, aramid fibers, cellulose fibers, and combinations thereof. One suitable fabric nonwoven found useful with polyolefin film adhesives (such as polyethylene and polypropylene films) is that known under the trade designation VERATEC grade 1308287, available from International Paper Co.—Veratec Division. This particular fabric nonwoven comprises about 80 weight percent polyester fibers comingled with about 20 weight percent cellulose fibers, the fibers bound together with an acrylic binder so that this particular fabric nonwoven has a basis weight of 0.85 oz. per square yard, and has no silicone additive. Useful thicknesses of the nonwoven fabric range from about 0.01 cm to about 0.03 cm, measured in accordance with American Society for Testing and Materials ("ASTM") test number ASTM D-1777. Useful basis weights preferably range from about 0.75 to about 0.95 oz. per square yard, as measured in accordance with ASTM D-3776-79. Preferably, the machine direction tensile breaking load of useful fabric nonwovens is at least 5 pounds per inch (0.89 kg per cm), more preferably at least 9 pounds per inch (1.6 kg per cm), measured using a 7 inch (17.8 cm) long by 1 inch (2.54 cm) wide strip of fabric nonwoven, and tested using a tensile testing machine known under the trade designation "Sintech", with jaws initially separated by a distance of 5 cm, and then pulled apart at a rate of 0.5 cm per second. Tensile breaking load is measured in accordance with ASTM D-1682-64 (1975).

Suitable paper for use in coated abrasives of the invention, particularly when a fabric nonwoven is to be used as a shelling-resistant layer, include the 150 grams per square meter buff colored paper available from Monadnock Paper Mills, Inc., Bennington, N.H., known under the trade designation "High Internal Bond Fourdrinier Paper." This paper has a thickness ranging from about 190 to about 206 micrometers, although useful thicknesses range from about 100 to about 300 micrometers. Paper backings useful in the invention preferably have Gurley porosity values ranging from about 10 to about 40 seconds per 100 cc air passage, more preferably ranging from about 15 to about 25 seconds per 100 cc of air passage, measured in accordance with FTMS No. 191, Method 5452 (Dec. 31, 1968) (as referred to in the *Wellington Sears Handbook of Industrial Textiles* by E. R. Kaswell, 1963 Ed., p. 575) using a Gurley Permeometer (available from Teledyne Gurley, Inc., Troy, N.Y.). The paper is preferably mechanically or chemically primed to enhance adhesion of the adhesive 34 thereto. A preferred priming method involves corona treatment.

Suitable polymeric films for use in the articles of the invention include polyesters, polyolefins, polyamides, polyvinyl chloride, polyacrylates, polyacrylonitrile, polystyrene, polysulfones, polyimides, polycarbonates, cellulose acetates, polydimethyl siloxanes, polyfluorocarbons, and blends and copolymers thereof, such as copolymers of ethylene and acrylic acid, copolymers of ethylene and vinyl acetate. These polymeric films may contain additives, colorants, fillers, crosslinking agents, dispersants, plasticizers, and mixtures thereof, and the films may be oriented or unoriented. Another example of a polymeric film is disclosed in U.S. Pat. No. 5,304,224. Useful polymeric films have thickness ranging from about 0.01 mm to 0.25 mm, more preferably about 0.05 mm. One particularly preferred class of films includes those which are "microvoided." As used herein, "microvoided" means the film has internal porosity. A particularly preferred film is microvoided polyester (preferably polyethylene terephthalate) film having thickness ranging from 0.01 mm to 0.25 mm, more preferably about 0.05 mm. One microvoided polyester film useful in the invention is that known under the trade designation 475/200 MELINEX MV available from ICI Limited, United Kingdom.

Coated abrasive articles made in accordance with this invention can also include such modifications as are known in this art. For example, a back coating such as a pressure-sensitive adhesive (PSA) can be applied to the non-abrasive or back side of the backing, and various supersize coatings, such as zinc stearate, can be applied to the abrasive surface to prevent abrasive loading; alternatively, the supersize coating can contain grinding aids to enhance the abrading characteristics of the coated abrasive, or a release coating to permit easy separation of PSA from the coated abrasive surface in cases where the coated abrasive is in the form of a roll of abrasive sheets, as illustrated in U.S. Pat. No. 3,849,949, incorporated by reference herein.

Representative PSAs useful for abrasive articles of the invention include latex crepe, rosin, acrylic polymers and copolymers such as polybutylacrylate and the like, polyacrylate esters, vinyl ethers such as polyvinyl n-butyl ether and the like, alkyd adhesives, rubber adhesives such as natural rubber, synthetic rubber, chlorinated rubber, and the like, and mixtures thereof. A particularly preferred type of PSA is a copolymer of isooctylacrylate and acrylic acid.

In the coated abrasive embodiments of the invention it is common and sometimes preferable to utilize a "nonloading" or "load-resistant" supersize coating. "Loading" is the term used in the abrasives industry to describe the filling of spaces between the abrasive particles with swarf (the material abraded from the workpiece) and the subsequent build-up of that material. For example, during wood sanding, swarf comprised of particles becomes lodged in the spaces between abrasive particles, dramatically reducing the cutting ability of the abrasive particles. Examples of such loading resistant materials include metal salts of fatty acids, urea-formaldehyde resins, waxes, mineral oils, crosslinked siloxanes, crosslinked silicones, fluorochemicals, and combinations thereof. A particularly preferred load resistant supersize coating is zinc stearate in a cellulosic binder.

Nonwoven abrasive articles are also within the scope of the invention. An open, lofty fibrous substrate is provided having a binder which binds fibers at points where they contact, the binder made from a binder precursor composition of the invention. Optionally, abrasive particles or non-abrasive particles (such as fillers) may be adhered to the fibers by the binder if the user desires. Nonwoven abrasives are described generally in U.S. Pat. Nos. 2,958,593 and 4,991,362, both incorporated by reference herein.

Cured binder precursors of this invention can also be used to make bonded abrasive products. Bonded abrasive products typically consist of a shaped mass of individual or agglomerated abrasive grains held together by an organic or ceramic binder material. The shaped, cured mass is preferably in the form of a grinding wheel. However, it is not necessary to place the binder precursor composition and abrasive grains into a mold prior to curing the binder precursor. For example, the binder precursor and abrasive grains may be poured onto a surface and cured into a flat sheet of bonded abrasive.

Abrasive particles useful in the invention can be of any conventional grade utilized in the formation of coated and open, lofty nonwoven abrasives and can be formed of, for example, flint, garnet, aluminum oxide, ceramic aluminum oxide, alumina zirconia (including fused alumina zirconia such as disclosed in U.S. Pat. Nos. 3,781,172; 3,891,408; and 3,893,826, commercially available from the Norton Company of Worcester, Mass., under the trade designation "NorZon"), diamond, silicon carbide (including refractory coated silicon carbide such as disclosed in U.S. Pat. No. 4,505,720), alpha alumina-based ceramic material (available from Minnesota Mining and Manufacturing Company under the trade designation "CUBITRON") as disclosed in U.S. Pat. Nos. 4,314,827; 4,518,397; 4,574,003; and 4,744,802; 4,770,671; 4,881,951, or mixtures thereof. The abrasive particles may be individual abrasive grains or agglomerates of individual abrasive grains. The frequency (concentration) of the abrasive grains on the backing is also conventional. The abrasive grains can be oriented or can be applied to the backing without orientation, depending upon the requirements of the particular coated abrasive product.

The choice of abrasive particle type and size is somewhat dependent on the surface finish desired. The surface finish of the workpiece may be determined before and after abrasion by mounting the workpiece in the specimen holder of a profilometer instrument, such as that known under the trade designation "Rank Surtronic 3", available from Rank Taylor-Hobson, Leicester, England. $R_{tm}$, which is the mean of the maximum peak-to-valley values from each of 5 sampling lengths, is typically recorded for each test. It is desirous to produce a coated abrasive that exhibits an increase in cut while producing an acceptable surface finish on the workpiece.

Methods of Making Abrasive Articles

One advantage of the process of making the abrasive articles of this invention over those previously known is the reduction in VOC emissions by the use of low free aldehyde resins. The inclusion of urea derivative reactants in the coatable binder precursor compositions described herein also significantly reduces formaldehyde emissions during curing of the binder precursor compositions, and may also increase water tolerance of the uncured binder precursor composition. Careful selection of the urea-aldehyde resin and will allow coatable viscosities to be obtained with only water as solvent. Organic solvents contributing to atmospheric VOC are then not required for viscosity adjustment.

In the manufacture of coated abrasive articles of the invention, the coatable binder precursor compositions, when cured, can be used as a treatment coating for the backing, e.g., paper or plastic sheeting, to provide a back coating (backsize coating) or front coating (presize coating) thereto, as a make coating to which abrasive grains are initially anchored, as a size coating for tenaciously holding abrasive grains to the backing, or for any combination of the aforementioned coatings. In addition, the coatable binder precursor compositions of this invention, when cured, can be used in coated abrasive article embodiments where only a single-coating binder is employed, i.e., where a single-coating takes the place of a make coating/size coating combination.

When employing polymeric film backings, the surface of the polymeric film to which the abrasive coating is to be applied is primed to increase the adhesion of the abrasive coating to the film.

In manufacturing paper-backed coated abrasives of the invention, one method generally comprises:

(1) providing a paper layer having a front and a back surface;

(2) providing a coatable slurry comprising abrasive particles and a binder precursor composition, the binder precursor composition comprising a major portion of a non-solidified urea-aldehyde resin having a low free aldehyde content and cocatalyst, and a minor portion of a second component, said second component being a solids portion of a latex;

(3) coating the slurry onto the front surface of the paper layer to form a wet coated backing; and (4) exposing the wet coated backing to an energy source sufficient to at least partially cure the binder precursor composition.

Preferred methods of this type include those wherein prior to coating the slurry onto the front surface of the paper layer, a latex barrier primer is coated onto the front surface of the paper layer. Any of the lattices mentioned herein below may be used. Also, as mentioned previously, it is preferred that a nonwoven fabric layer be disposed between the paper layer and the abrasive coating, as illustrated in FIG. 5. Preferably, this is made using a continuous process, wherein a roll of polyolefin film, nonwoven fabric, and paper are laminated together at temperatures sufficient to soften the polyolefin layer. Alternatively, a hot-melt adhesive may be applied to either the paper or the nonwoven fabric, with adhesion of the layers thereafter. In manufacturing embodiment 5 of FIG. 5, make coating precursor is then applied to the fabric nonwoven side of the paper/fabric nonwoven laminate, and abrasive particles 18 embedded therein in known fashion, preferably electrostatically. A size coating precursor is then applied over abrasive particles 18 and make coating precursor, after which the entire structure is subjected to curing conditions as explained in the Examples herein. Either one or both of the make coating 24 or size coating 26 has the low free aldehyde resin and cocatalyst therein, as described herein. Priming can be accomplished by surface alteration or by a chemical primer. Examples of surface alterations include corona treatment, UV treatment, electron beam treatment, flame treatment, and scuffing to increase the surface area.

One class of useful chemical primers are the primer/adhesives taught in U.S. Pat. No. 4,906,523 incorporated herein by reference. The primer/adhesives described in this patent comprise a colloidal dispersion of:

1. one or more thermoplastic elastomers that are soluble in at least one proton accepting solvent (for example polyester-polyurethanes, polyether-polyurethanes, homopolymers and copolymers of acrylate esters such as poly(ethyl acrylate) and poly(ethyl acrylate-ethylene) nitrile rubbers such as poly(butadiene acrylonitrile) chlorosulfonated polyolefins, and fluorocarbon elastomers), 2. one or more colloidal inorganic oxides, particularly silicon dioxide, present as an organosol, and 3. a volatile solvent mixture comprising (a) one or more organic proton accepting solvents preferably having a boiling point of 100° C. or less at atmospheric pressure, (for example acetone, methyl ethyl ketone, methyl t-butyl ether, ethyl acetate, acetonitrile, tetrahydrofuran) and (b) one or more organic, hydroxy group-containing solvents, preferably having a boiling point of 125° C. or less at atmospheric pressure (for example water and alkanols, such as methanol, ethanol, propanol, isopropanol, 2-ethoxyethanol, and 2-propoxyethanol).

Another class of chemical primers useful in the present invention are aziridine-type materials as disclosed in U.S. Pat. Nos. 4,749,617 and 4,939,008, both incorporated herein by reference. These patents describe compositions useful in adhering two items together, the composition of the '617 patent comprising an aziridine-functional material and an organic resin (such as polyvinyl chloride, methyl methacrylate, urethane polymers, and polyester resins) wherein the aziridine-functional material and the organic resin are present in a weight ratio such that there is at least 0.1 part of the resin present for each part of the aziridine-functional material. The composition of the '008 patent is an aziridine-functional material essentially free of other organic resins.

Aziridine-functional materials useful in the primer compositions may be represented by the general formula

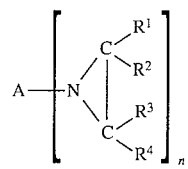

wherein A is an n valent organic or inorganic group, n is a whole number of at least one (preferably 2 to 4), and $R^1$, $R^2$, $R^3$ and $R^4$ may be the same or different and are individually selected from the group consisting of hydrogen and lower alkyl (branched or straight chain) groups containing 1 to 8 (preferably from 1 to 4) carbon atoms.

The nitrogen atom of the aziridine group is preferably linked to an atom having a valence or 4 or 5 (most preferably C or P). Preferably $R^1$, $R^2$ and $R^3$ are each hydrogen and $R^4$ is selected from hydrogen and alkyl containing from 1 to 4 (most preferably 1 to 2) carbon atoms.

"A" may be a n aliphatic, aromatic or alicyclic organic radical which may contain atoms such as oxygen, sulfur, nitrogen, and the like. "A" may also be an inorganic radical, such as

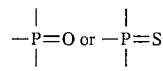

"A" is preferably

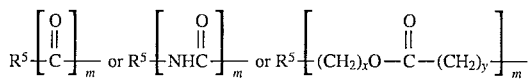

where $R^5$ is an m-valent aliphatic, aromatic or alicyclic radical which may contain atoms other than carbon, e.g., oxygen, nitrogen or sulfur, m is a whole number of at least 1, and x and y are individually 0, 1 or 2.

Specific examples of useful aziridine-functional materials include trimethylol-tris{-(N-[methylaziridinyl])}propionate, 1,1'-(1,3-phenylenecarbonyl)bis[2-methyl aziridine], and the like, while specifically useful organic resins include the polyester-functional urethanes known under the trade designation "Estane" from B. F. Goodrich.

When the coatable binder precursor compositions described above are applied to a backing in one or more treatment steps to form a treatment coating, the treatment coating can be cured thermally by passing the treated backing over a heated drum; there is no need to festoon cure the backing in order to set the treatment coating or coatings. After the backing has been properly treated with a treatment coating, the make coating can be applied. After the make coating is applied, the abrasive grains are applied over the make coating. Next, the make coating, now bearing abrasive grains, is exposed to a heat source which generally solidifies or sets the binder sufficiently to hold the abrasive grains to the backing. Then the size coating is applied, and the size coating/abrasive grain/make coating combination is exposed to a heat source, preferably via a drum cure. This process will substantially cure or set the make and size coating used in the coated abrasive constructions.

The coatable binder precursor compositions useful in the invention having a low free aldehyde and cocatalyst, when cured, only need to be in at least one of the binder layers for paper-backed abrasive articles, i.e., treatment coating, make coating, size coating, comprising the coated abrasive article, and they are preferred for use in polymeric film-backed articles. It does not need to be in every binder layer; the other binder layers can utilize various other binders known in the art, such as epoxy resin-based binders.

Alternatively, the abrasive surface may be derived from a binder precursor slurry, which includes abrasive particles, a major portion of a urea-aldehyde resin (low free aldehyde and cocatalyst for paper-backed), and optional ingredients. This slurry is coated onto the backing via knife coating, roll coating, spray coating rotogravure coating, and like methods. As stated previously, primers may be employed prior to coating the backing with the slurry.

It is also contemplated that cured versions of the coatable binder precursor compositions can be employed as a binder for open lofty nonwoven abrasive products of the type described in U.S. Pat. No. 2,958,593. Open, lofty nonwoven abrasive products typically include an open, porous, lofty, mat of fibers having abrasive grains bonded thereto by a binder. In one preferred embodiment, the method comprises combining a 30–95% solids solution of a urea-aldehyde resin with abrasive grains to form a coatable, thermally curable binder precursor slurry, coating the coatable, thermally curable binder precursor slurry onto at least a portion of the fibers of a lofty, open fibrous mat, and subjecting the resulting structure to conditions sufficient to affect curing of the binder precursor composition, preferably by passing heated air or other fluid through the coated web. Optionally, additional abrasive grains may be applied prior to curing the binder precursor solution, for example, by electrostatic precipitation or electrospray methods. A suitable electrospray coating process is described in U.S. Pat. No. 4,748,043, incorporated by reference herein.

Latex

When polymeric film is used as the backing for coated abrasives of the invention, it is desirable to add from 1 to about 20 weight percent, more preferably from about 5 to 15 weight percent, of a latex (preferably an EVA latex) to the binder precursor composition. A portion of the urea-formaldehyde resin is substituted with the latex.

The latex functions to improve the adhesion of urea-aldehyde binders to polymeric films, which tend to be very smooth. While not intending to be bound by any particular theory, it appears the latex functions to allow adhesion to the polymeric film. Useful acrylic latices are those which are 50–99 percent by weight solids water emulsions.

Suitable latices include those known under the trade designation "Airflex 421" available from Air Products & Chemicals, Inc., which comprises vinyl acetate-ethylene copolymer.

Binder precursor compositions having the above described properties are very compatible with lattices. A "compatible" binder precursor/resin emulsion mixture will preferably result in a clear film upon drying, although this is not required. It is believed that this compatibility may be attributed to the composition of the binder precursors used in the invention which do not contain organic solvent and have the above-described free aldehyde levels.

Further examples of lattices (sometimes referred to as resin emulsions) that can be included in the binder precursor compositions of the invention include acrylonitrile-butadiene copolymer emulsions, acrylic emulsions, vinyl acetate emulsions, butadiene emulsions, butadiene-styrene emulsions and combinations thereof. These resin emulsions are commercially available from a variety of different sources including those acrylic resin emulsions known under the trade designations "Rhoplex" and "Acrylsol", commercially available from Rohm and Haas Company; the acrylic latices known under the trade designations "Flexcryl" and "Valtac" commercially available from Air Products & Chemicals Inc.; the acrylic latices known under the trade designations "Synthemul" and "Tylac", commercially available from Reichold Chemical Co.; the acrylic and nitrile latices known under the trade designations "Hycar", and the styrene/butadiene latex known under the trade designation "Goodrite", commercially available from B. F. Goodrich; the latex known under the trade designation "Chemigum", commercially available from Goodyear Tire and Rubber Co.; the latex "Neocryl" commercially available from ICI; the latex known under the trade designation "Butafon", commercially available from BASF; vinyl acetate homopolymer and vinyl acetate/ethylene copolymer emulsions known under the trade designations "VINAC" commercially available from Air Products & Chemicals Inc.; and the latex known under the trade designation "Res" commercially available from Union Carbide.

The latices or resin emulsions are typically and preferably 100 percent water based and do not contain any organic solvent for the purposes of this invention. However, some resin emulsions may contain a very minor amount, i.e., less than 20 weight percent, preferably less than 10 weight percent, and most preferably less than 5 weight percent organic solvent. Two resins commonly mixed with urea-formaldehyde resins are: (1) the resin known under the trade designation "VINAC 281", a polyvinyl acetate homopolymer, and (2) the resin known under the trade designation "VINAC 400", a vinyl acetate/ethylene copolymer, both available from Air Products & Chemicals, Inc., Allentown, Pa.

It is also within the scope of this invention that more than one latex or resin emulsion may be included in the binder precursors useful in the invention. The ratio on a solids basis will range from about 10 to 99 percent urea-aldehyde resin to about 1 to 90 percent latex or resin emulsion, preferably between 50 to 97.5 percent urea-aldehyde resin to about 2.5 to 50 percent latex or resin emulsion, and most preferably 75 to 97.5 percent urea-aldehyde resin to about 2.5 to 25 percent latex or resin emulsion.

If the low free aldehyde urea-aldehyde resins useful in the invention are not incorporated into all of the afore-mentioned coatings of a coated abrasive, then other resinous adhesives can be utilized for the coatings not made using the urea-aldehyde binder precursor. Examples of other typical and preferred resinous adhesives include acid and base-cured phenolic resins, aminoplast resins, melamine resins, epoxy resins, polyurethane resins, isocyanurate resins, urea-formaldehyde resins, isocyanurate resins, radiation-curable resins (i.e., resins made using one or more unsaturated monomers) such as acrylated urethane resins, acrylated epoxy resins, and the like, resin emulsions as above-described, and mixtures thereof.

Additionally, the preferred low aldehyde urea-aldehyde resins can be blended with minor amounts of one or more resinous adhesives, such as acid-cured phenolic resins and melamine resins, and then this mixture utilized in one or more of the coatings.

There are two main types of phenolic resins: resole and novolac. Resole phenolic resins have a molar ratio of formaldehyde to phenol of greater than or equal to one, typically between 1.0:1.0 to 3.0:1.0, and are base catalyzed. Novolac phenolic resins have a molar ratio of formaldehyde to phenol of less than one, are typically in the form of a powder, and are typically acid catalyzed. This invention contemplates that liquid resole phenolic resins can be used in coatings separate from the acid catalyzed urea-formaldehyde resins used in the invention, and that acid-curable phenolics may be used either in separate coatings, or mixed with acid curable urea-formaldehyde resins.

Phenolic binder precursors, if used in the invention, preferably consist essentially of the reaction product of phenol and formaldehyde. Particularly preferred base catalyzed phenolic binder precursors useful in the invention will have a molar ratio of formaldehyde to phenol between 1.5:1.0 to about 2.5:1.0, preferably between 1.6:1.0 to 2.2:1.0, most preferably between about 1.8:1.0 to about 2.0:1.0.

If a phenolic binder precursor is to be mixed in liquid form with the acid curable urea-aldehyde resins used in this invention, an acid-catalyzed phenolic resin must be used. The presence of this acidic catalyst typically and preferably enhances the reaction or polymerization rate of the urea derivative and aldehyde of the binder precursor. The pH of the binder precursor should range from about 2 to about 7, more preferably from about 2 to 5.

Examples of acidic catalysts include hydrochloric acid, nitric acid, formic acid, p-toluene-sulfonic acid, and combinations thereof. The preferred acidic catalyst is hydrochloric acid.

The amount of acidic catalyst should be less than 5 percent, preferably less than 2 percent, more preferably less than 1 percent and most preferably between 0.5 to 0.9 percent by weight of the urea-aldehyde resin.

TEST METHODS

The following test methods were used to characterize the compositions and articles of the invention.

Peak Exotherm Temperature

Differential scanning calorimetry (DSC) thermograms of samples of binder precursor solutions were obtained with a DSC machine known under the trade designation "Series 9990 Differential Thermal Analyzer", from E I dupont de Nemours & Co., Wilmington, Del. ("duPont"). The machine was operated at a heating rate of 10° C./min over a temperature range of 20°–140° C. The binder precursors tested were weighed and mixed in a separate container. A small amount of the binder precursor to be tested (50–90 mg) was then placed in a large volume capsule, and the capsule immediately hermetically sealed. A sealed capsule containing the binder precursor to be tested was then placed in the machine and heated at the rate mentioned above to determine the peak exotherm temperature, which appeared as a maximum temperature peak on a chart readout. Differential scanning calorimetry is described generally in the article by Watson et al., *A Differential Scanning Calorimeter for Quantitative Differential Thermal Analysis,* Anal. Chem., Vol. 36, No. 4, pp. 1233–1238 (June, 1964).

Pot Life Test

The pot life of a binder precursor solution is generally considered to be the length of time from initial mixing of catalyst into the resin ingredients until the viscosity of the binder precursor solution increases twofold over its initial viscosity. The viscosities were measured using a Brookfield viscometer, #3 spindle, at 30 rpm, at about 25° C.

Gel Time at 75° C.

Gel time gives an indirect measurement of the degree of polymerization at a particular catalyst level. The lower the gel time the more advanced in molecular weight the resin is considered to be. A commercially available gel time apparatus known by the trade designation "Sunshine Gelmeter", available from Sunshine Co., was used in each measurement. This gel time measuring apparatus is a torsion apparatus, wherein a glass rod (168 mm long by 6.35 mm diameter) is attached at one end via a chuck to a torsion wire (0.254 mm diameter music wire, available from Sunshine Co.), with the torsion wire in turn attached to a drive mechanism via a magnetic coupling so that the wire/glass rod combination hang vertically from the drive mechanism. About 2.81 cm of wire existed between the chuck and the magnetic coupling. A test tube (150×18 mm) was filled to about 65 mm depth with the resin to be tested (originally at 25° C.±3° C.), and the tube placed in a water bath which was at 75° C. The glass rod was lowered into the resin with the lower end of the glass rod about 6.35 mm from the tube bottom, and so that the resin level in the tube was below the water bath level. The glass rod/torsion wire were then rotated in the bath by the drive mechanism. As this combination was rotated a projection extending from the chuck connecting the glass rod and torsion wire also rotated, finally touching a similar, stationary projection extending from the machine. The gap between the projections was originally set at 2.38 mm for each test. The time required for the rotating projection to touch the stationary projection was recorded as the gel time for each resin.

Dry Schiefer Test

This test provided a measure of the cut (material removed from a workpiece) and finish (the relative quality of the abraded surface) of coated abrasive articles under dry conditions (about 22° C. and about 45% Relative Humidity).

A 10.16 cm diameter circular specimen was cut from the abrasive material tested and secured by a pressure-sensitive adhesive (3M Industrial Tape #442 double adhesive tape) to a back-up pad. The back-up pad was secured to the driven plate of a Schiefer Abrasion Tester (available from Frazier Precision Company, Gaithersburg, Md.). Doughnut shaped acrylic plastic workpieces, 10.16 cm outside diameter, 5.24 inside diameter, 1.27 cm thick, available under the trade designation "POLYCAST" acrylic plastic from Sielye Plastics, Bloomington, Minn., were employed as workpieces. The initial weight of each workpiece was recorded to the nearest milligram prior to mounting on the workpiece holder of the abrasion tester. A 4.54 kg weight was placed on the abrasion tester weight platform and the mounted abrasive specimen lowered onto the workpiece and the machine turned on. The machine was set to run for 500 cycles and then automatically stop. After each 500 cycles of the test, the workpiece was wiped free of debris and weighed. The cumulative cut for each 500-cycle test was the difference between the initial weight and the weight following each test.

Off-Hand Abrasion Test I

A steel substrate having a known paint film was abraded in each case with coated abrasives made in accordance with the invention which were attached to a random orbital sander (known under the trade designation "DAQ", from National Detroit, Inc.). The abrading pressure was about 0.2 kg/cm$^2$, while the sander operated at about 60 PSI(@TOOL) (surface meters per minute or rpm). The steel substrate having a paint film was purchased in each case from ACT Company of Hillsdale, Mich., and consisted of a steel substrate coated with 0.074 mm to 0.127 mm thick paint. The paint was a dupont base-coat clear-coat paint known under the trade designation "RK7103", coated by the ACT Company using General Motors paint specification number 998-4065. The cut in grams was computed in each case by weighing the paint-coated substrate before abrading and after abrading for a predetermined time, for example, 1, 2, or 3 minutes.

Off-Hand Abrasion Test II

A steel substrate coated with a primer typically used in automotive paints was abraded in each case with coated abrasives made in accordance with the invention which were attached to a random orbital sander (known under the trade designation "DAQ" from National Detroit, Inc.). The abrading pressure was about 0.2 kg/cm$^2$, while the sander operated at about 60 psi(@TOOL) (surface meters per minute or rpm). The steel substrates were purchased from ACT Company of Hillsdale, Mich., and were subsequently coated with a PPG primer known under the trade designation KONDAR, Acrylic Primer DZ-3. The cut in grams was computed in each case by weighing the primer-coated substrate before abrading and after abrading for a predetermined time, for example, 1, 2, or 3 minutes.

MATERIALS

The following materials were used as described in the examples (quotation marks indicate trade designations):

"AL3029R" from Borden Chemical, is an unmodified (i.e. contains no furfural) urea-formaldehyde resin, 65% solids, 325 cps (Brookfield viscometer, #3 spindle, 30 rpm, at 25° C., a free formaldehyde content of 0.1–0.5%, and a F/U of 1.4:1.0 to 1.6:1.0.

The chemical known under the trade designation "TERGITOL" is a nonionic surfactant available from Union Carbide;

"P-320" is grade P-320 aluminum oxide abrasive grains having average particle size of 46 micrometers, available under the trade designation "ALODUR FRPL" from Treibacher, Treibach, Austria;

"P-400" is grade P-400 aluminum oxide abrasive grains having average particle size of 35 micrometers, available under the trade designation "ALODUR FRPL" from Treibacher, Treibach, Austria;

"Nopco 1097A" is the trade designation for a calcium stearate dispersion, available from Henkel Nopco.

"Vinacryl 71322" is the trade designation for a styrene-acrylate copolymer emulsion, available from Vinyl Products Ltd.

"FC-396" is the trade designation for a fluorochemical ester/acrylate blend available from Minnesota Mining & Manufacturing Company (3M), St. Paul, Minn.

"AlCl$_3$" is a 28 percent by weight aqueous solution of AlCl$_3$●6H$_2$O in water, available from PVS Chemicals, Detroit, Mich.;

"NH$_4$Cl" is ammonium chloride which can be obtained from a number of suppliers, and is dissolved in water at about 25 weight percent;

"AMP" is 2-amino-2-methyl-1-propanol, available from Kodak, Chemicals;

"film backing" is 2 mil (0.05 mm thick) microvoided polyester film available from ICI and Minnesota Mining and Manufacturing Co., St. Paul, Minn.;

"A" weight paper is a paper weighing between 80–110 g/m$^2$ with a latex barrier coating to allow topical application of a make coating resin;

"A3469" is a designation for a dispersion of zinc stearate in water, also containing a cellulosic binder; and "Airflex 421" is the trade designation for a vinyl acetate-ethylene copolymer latex, available from Air Products.

In addition to the above, glycerol was used in Example 9 as a plasticizer. Feldspar, an aluminosilicate, was used in Example 9 as a filler.

EXAMPLES

The following non-limiting examples will further illustrate the present invention. All coating weights are specified in grams/square meter (g/m$^2$). All resin formulation ratios and percentages are based upon weight, and the weight ratio of formaldehyde to urea in the urea-formaldehyde resin used to make the coatable binder precursors ranged from about 1.4:1.0 to about 1.6:1.0 (standard urea-formaldehyde resin available from Borden Chemical, known under the trade designation "AL3029R").

I. Paper-backed Coated Abrasives

Comparative Examples A–J and Examples 1–7

For comparison purposes it is best to compare the single catalyst systems to the combined catalyst system. Thus, a Comparative Example of the single catalyst systems was compared with the cocatalyst system used in the present invention.

In Examples 1–6 and Comparative Examples A–C, make coatings were applied using "typical factory conditions" to "A" weight paper backings. Typical factory conditions included a make coating of 8–62 gm/m$^2$ wet weight (4.2–32.2 gm/m$^2$ dry weight); Grade P-320 aluminum oxide abrasive particles electrostatically coated onto the make coating and the make coating then cured at 60°–90° C. for 2–45 minutes; and size coating (same composition as make coating) applied at wet weight of 29–124 gm/m² (dry weight of 16–68 gm/m²) and cured at 50°–90° C. for 2–90 minutes. Examples 1–6 and Comparative Examples A–C employed A3469 as a supersize coating.

When $AlCl_3$ was used alone as catalyst (Comparative Examples A–C), the gel time, pot life and peak exotherm temperatures were all dependent on the concentration of the $AlCl_3$. This data is summarized in Table 1. Performance of coated abrasives of Comparative Examples D–F (similar to Comparative Examples A–C except for slightly different amounts of $AlCl_3$) was also dependent upon the concentration of $AlCl_3$ and the cure conditions (time and temperature). This is shown in Table 2.

In order to achieve a good performing product, using factory cure conditions (i.e. curing temperature of about 80°–85° C., web speed ranging from 10 to 100 meters/min), the concentration of $AlCl_3$, must be near 1 weight percent, based on weight of solution. The drawback with a 1 weight percent concentration of $AlCl_3$ was that the pot-life was way too short for the batch operation used in the factory.

When $NH_4Cl$ was used alone as the catalyst (Comparative Examples G–I, Table 3), the gel time, pot life and peak exotherm temperatures were all independent of the $NH_4Cl$ concentration, affording an advantage over the use of a Lewis acid catalyst. However, the activity (ability of a catalyst to catalyze the reaction) of the $NH_4Cl$ was found to be dependent on the free formaldehyde concentration in the binder precursor solution due to the following reaction (5):

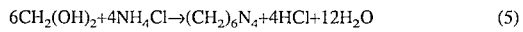

$$6CH_2(OH)_2+4NH_4Cl \rightarrow (CH_2)_6N_4+4HCl+12H_2O \qquad (5)$$

With the low free aldehyde resins, such as that known under the trade designation "AL3029R", from Borden Chemical, the $NH_4Cl$ did not activate the condensation reaction (4) very readily until the temperature of the reaction was increased above that normally used. However, as mentioned above, increased temperature tended to curl the edges of the coated abrasive and did not render performance improvements. The performance of the coated abrasive was independent of the $NH_4Cl$ concentration. Thus, the drawbacks of the use of $NH_4Cl$ were the long gel times, and only moderate performance levels obtained with typical factory cure conditions.

Figure 6:
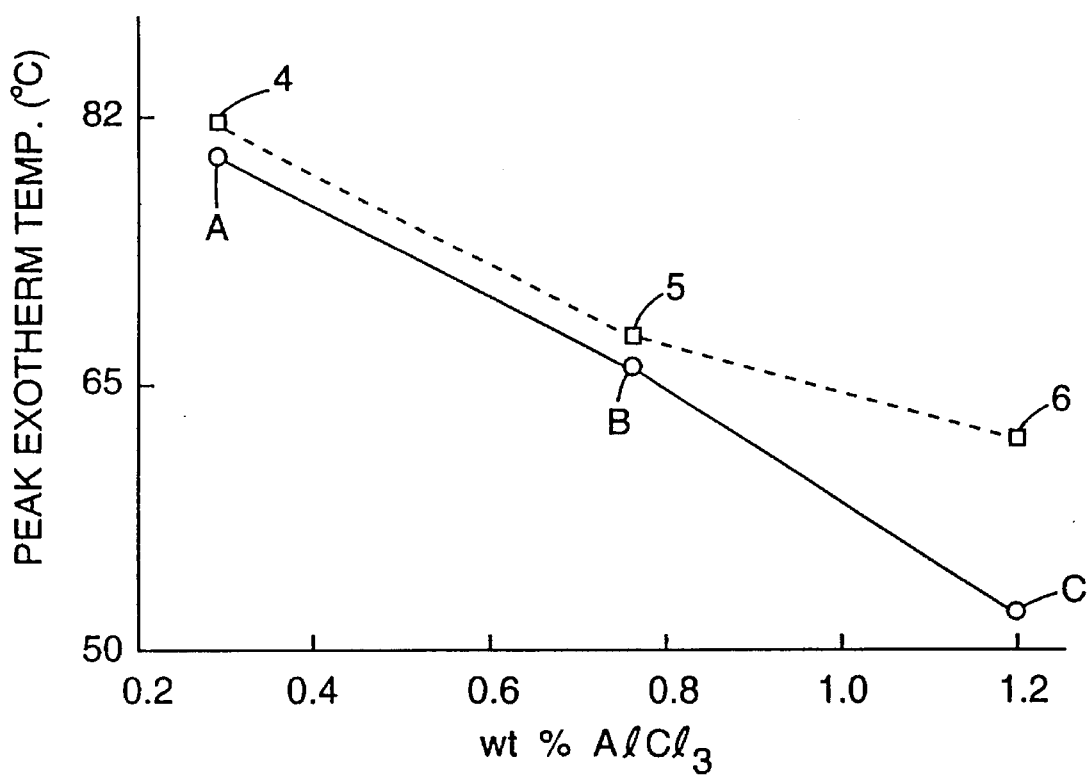
FIGS. 6 and 7 (discussed in the Examples) illustrate graphically the apparent catalytic activity of various catalysts in binder precursor solutions as determined by differential scanning calorimetry.
Figure 7:
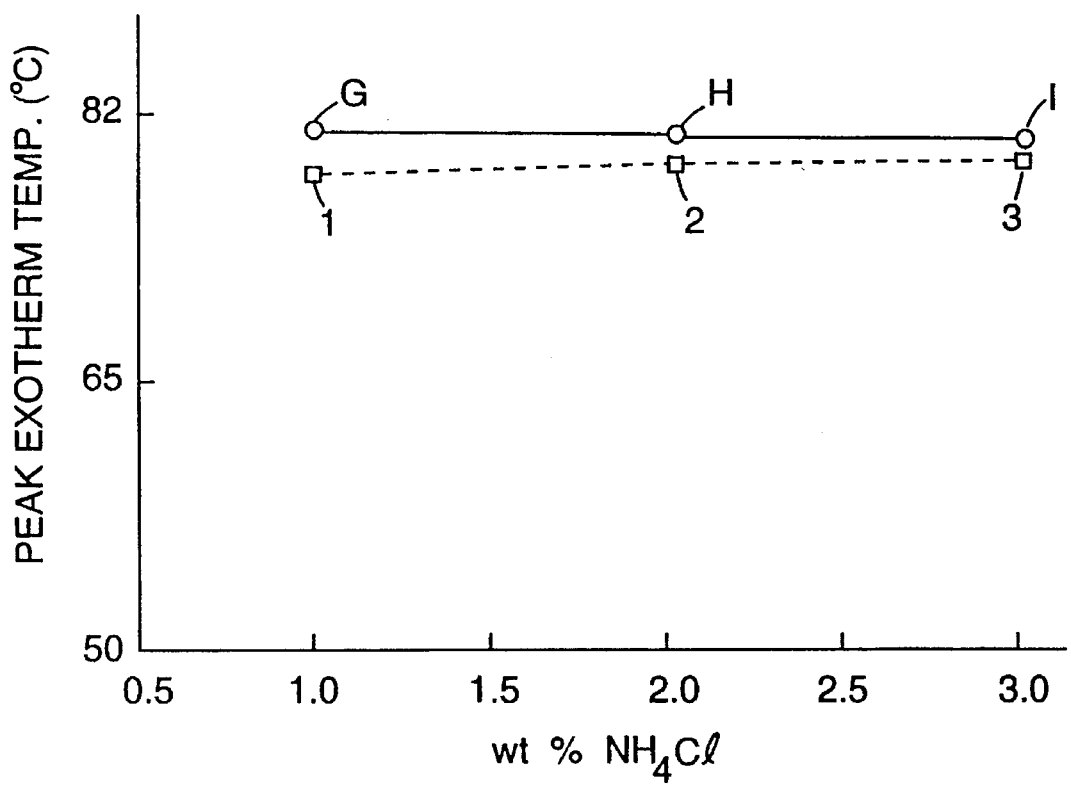

In Examples 1–6 (Tables 4 and 5), the urea-formaldehyde resin known under the trade designation "AL3029R" was catalyzed with x%$AlCl_3$+y%$NH_4Cl$ (cocatalyst), and the gel time, pot life and DSC peak exotherm temperatures were all dependent on the $AlCl_3$ concentration and independent of the $NH_4Cl$ concentration. Based on the DSC data (FIGS. 5 and 6), there would be little difference expected in activity between the AL3029R+x%$AlCl_3$ catalyst used in the binder precursor solutions of Comparative Examples A–F and the cocatalyst AL3029R+2%$NH_4Cl$+x%$AlCl_3$ used in Examples 4–6. What was observed experimentally, however, in comparing Example 7 and Comparative Example J (Table 7), when these catalysts were compared in size resins for grade P-320 coated abrasives, was that when the cocatalyst was used with the AL3029R resin, a 20–30% increase in performance (defined in Table 2) over the AL3029R+ x%$AlCl_3$ binder precursor solutions was obtained using the same cure conditions.

The reason for the improved activity observed using the cocatalyst system in the binder precursor solutions of the invention is believed to be that the $NH_4Cl$ increased the kinetics of the curing reaction. It can also be descriptively thought of that the more active $AlCl_3$ initiated the reaction, which generated free formaldehyde, which in turn yields additional HCl via reaction (5), lowering the pH and increasing the kinetics of the condensation reaction.

Example 8 and Comparative Example K

A binder precursor solution of the present invention containing the cocatalyst was coated onto "A" weight paper in a factory experiment. The formulation in Table 7 was coated as a size resin over a glue make resin and Grade P-320 aluminum oxide abrasive grains for Example 8, while Comparative Example K was a coated abrasive having a construction known under the trade designation 3M216U "STIKIT PRODUCTION RN PAPER A WEIGHT FRE-CUT" available commercially from Minnesota Mining and Manufacturing Company, St. Paul, Minn. Both size resins were coated over the same make coating and abrasive grains, at the same weights and were cured using the same oven conditions. Both samples were tested via Off-hand Abrasion Test I using as supersize coating "A3469". The results of Off-hand abrasion tests are summarized in Table 8. In this case, the binder precursor solution of the invention which included a cocatalyst system (Example 8) showed a significant cut increase over Comparative Example K.

Example 9 and Comparative Example L

Another factory experiment was performed using the cocatalyst to determine a way to improve performance (via more cure) in a coarse grade urea-formaldehyde size coating/glue make coating construction. Comparative Example L used a size resin system containing 54% AL3029R urea-formaldehyde resin, 23.8% $H_2O$, 0.2% 2-amino-2-methyl-1-propanol (AMP), 5.2% glycerol, 9.9% feldspar, and 0.75% $AlCl_3$ as catalyst, which yielded coated abrasive after factory curing that was 25–30% undercured (based on performance testing using the Dry Schiefer Test and the definition of "fully cured" as defined in Table 2). On the other hand, Example 9, a coated abrasive made using a size resin consisting of 54% AL3029R, 23.8% $H_2O$, 9.9% feldspar, 5.2% glycerol, 6.3% $NH_4Cl$, 0.6% $AlCl_3$, and 0.16% AMP was only 5–11% undercured. This system also allowed coating at faster web speeds.

TABLE 1

Comparative Examples A–C
Physical properties of AL3029R + X % $AlCl_3$.

| Comp. Ex. | A | B | C |
| --- | --- | --- | --- |
| wt. % $AlCl_3$ | 0.3 | 0.75 | 1.20 |
| Gel Time at 75° C. (sec) | 105 | 70 | 45 |
| Pot Life (min) | 140 | 65 | 35 |
| Peak Exotherm Temp. (°C.) | 79 | 68 | 54 |

TABLE 2

Comparative Examples D-F
Performance data for AL3029R + X % AlCl₃

| Comp. Example | D | E | F |
|---|---|---|---|
| wt % AlCl₃ | 0.4 | 0.71 | 1.0 |
| Peak Exotherm Temp (°C.) | 77 | 69 | 61 |
| Cure Temp (15 min. at °C.) | 80 | 72 | 62 |
| Performance (% cured)* | 55% | 59% | 57% |

*% cured is defined as the average 2 minute cut of a coated abrasive cured at 10° C. above exotherm divided by the average 2 minute cut of post-cured samples (i.e. samples cured at 110° C. for about 60 minutes).

TABLE 3

Comparative Examples G–I
Physical properties of AL3029R + X % NH₄Cl.

| Comp. Ex. | G | H | I |
|---|---|---|---|
| wt % NH₄Cl | 1.0 | 2.0 | 3.0 |
| Gel Time at 75° C. (sec) | 515 | 515 | 515 |
| Pot Life (min) | 1080 | 1080 | 1080 |
| Peak Exotherm Temp. (°C.) | 81 | 81 | 81 |

TABLE 4

Examples 1–3
Physical properties of AL3029R + X % NH₄Cl + 0.35% AlCl₃.

| Example | 1 | 2 | 3 |
|---|---|---|---|
| wt % NH₄Cl | 1.0% | 2.0% | 3.0% |
| Gel Time at 75° C. (sec) | 95 | 95 | 90 |
| Pot Life (min) | 125 | 125 | 125 |
| Peak Exotherm Temp. (°C.) | 78 | 79 | 79 |

TABLE 5

Examples 4–6
Physical properties of AL3029R + 2% NH₄Cl + x % AlCl₃.

| Example | 4 | 5 | 6 |
|---|---|---|---|
| wt % AlCl₃ | 0.30% | 0.75% | 1.20% |
| Gel Time at 75° C. (sec) | 100 | 70 | 40 |
| Pot Life (min) | 125 | 55 | 40 |
| Peak Exotherm Temp. (°C.) | 81 | 69 | 63 |

TABLE 6

Comparison of AL3029R + x % AlCl₃ (Comparative Example J) with AL3029R + Y % NH₄Cl + x % AlCl₃ (Example 7)

| | Comp. Ex. J | Ex. 7 |
|---|---|---|
| Peak Exotherm Temp (°C.) | 73 | 75 |
| Cure Temp (15 min) (°C.) | 76 | 78 |
| Performance (% cured)* | 60% | 83% |

*see Table 2 for definition

TABLE 7

Typical binder precursor formulation of the invention (Example 8)

| AL3029R (65% solids) | 87.2% |
|---|---|
| H₂O | 7.5% |

TABLE 7-continued

Typical binder precursor formulation of the invention (Example 8)

| NH₄Cl (25% solids) | 4.7% |
|---|---|
| AlCl₃ (28% solids) | 0.6% |

TABLE 8

| SIZE RESIN | 1 MIN CUT (gm) | 3 MIN CUT (gm) |
|---|---|---|
| Comp. Ex. K AL8405 + 1% AlCl₃* | 2.14 | 4.27 |
| Example 8 AL3029R + Cocatalyst | 2.71 | 6.45 |

*the binder precursor solution known under the trade designation "AL8405" contains 7% furfuryl alcohol and 2–3% free formaldehyde Examples 10–11 and Comparative Examples M–U This set of examples compared the abrasion performance of paper-backed coated abrasives made using various acid catalysts. Examples 10 and 11 used a cocatalyst. The catalyst used in Examples 10–11 and Comparative Examples M–U are listed in Table 9.

For Examples 10–11 and all of Comparative Examples M–U the urea-formaldehyde resin used as make and size coatings was AL3029R, with make coating weight of about 12 g/m² (wet) and size coating weight of about 49 g/m² (wet), using P-320 abrasive grains coated at about 40 g/m². The size resin was cured in each case at 71° C. for 10 minutes, and also a portion of each coated abrasive that had size resin cure at 71° C. for 10 minutes was further "post-cured" at 113° C. for 60 minutes. Also, each of the examples in Table 9 (both cured and post-cured samples) had a calcium stearate supersize coating, coated at about 21 g/m² (wet), which was cured for 1 minute at 91° C.

Catalyst amounts in each instance were adjusted to give a binder precursor pH of about 4.1–4.3. In each case where AlCl₃ and FeCl₃ were used, they were present at 0.4 weight percent; NH₄Cl and (NH₄)₂SO₄ were used at 2.0 weight percent; p-toluene sulfonic acid (PTSA) was present at 0.65 weight percent; and formic acid (FA) was present at 0.25 weight percent, all referenced to total solids weight of the binder precursor solutions. "Cut" was determined using the Off-Hand Abrasion Test, described previously, using an abrasion time of 2 minutes. In addition, the "% cured" (as defined in Table 2) is also listed in Table 9.

TABLE 9

| Ex. | Catalyst | 71° C. cured cut (gm) | post-cured cut (gm) | % cured |
|---|---|---|---|---|
| 10 | AlCl₃ + NH₄Cl | 4.92 | 7.70 | 63.9 |
| 11 | AlCl₃ + (NH₄)₂SO₄ | 3.57 | 8.20 | 43.5 |
| M | NH₄Cl | 2.48 | 6.52 | 38.1 |
| N | AlCl₃ | 3.57 | 7.74 | 46.1 |
| O | (NH₄)₂SO₄ | 2.47 | 7.26 | 34.0 |
| P | FeCl₃ | 3.07 | 7.87 | 39.0 |
| Q | FeCl₃ + NH₄Cl | 3.33 | 7.83 | 42.5 |
| R | PTSA | 3.38 | 7.84 | 43.1 |

TABLE 9-continued

| Ex. | Catalyst | 71° C. cured cut (gm) | post-cured cut (gm) | % cured |
|---|---|---|---|---|
| S | PTSA + NH₄Cl | 3.43 | 7.59 | 45.2 |
| T | FA | 1.39 | 7.21 | 19.3 |
| U | FA + NH₄Cl | 1.80 | 7.38 | 24.4 |

From Table 9 it is evident that the use of the cocatalyst $AlCl_3+NH_4Cl$ in Example 9 produced paper-backed coated abrasives that were significantly (at least 17.8%) more cured than the any of the comparative examples, and the coated abrasive of Example 9 exhibited greater abrasion ability than use of $AlCl_3$ or $NH_4Cl$ alone. Also, the use of the cocatalyst $AlCl_3+(NH_4)_2SO_4$ exhibited the highest "post-cure" cut of all examples.

The above examples demonstrate that the binder precursor solutions of the invention exhibited increased activity such that a sufficient cure could be achieved under typical factory conditions for producing paper-backed coated abrasives, while the pot life of the binder precursor solutions were adequate for factory operations.

II. Polymeric Film-Backed Coated Abrasives

Example 12 and Comparative Example V

Example 12 utilized a 2 mil (0.05 mm thick) aziridine primed microvoided polyester film backing (67 g/m²; Specialty Film Division, Minnesota Mining and Manufacturing Company, St. Paul, Minn.) onto which was applied a make coating precursor consisting of: 74% AL-3029R, 10.4% Airflex 421 latex, 9.0% water, 6.0% NH₄Cl, and 0.6% AlCl₃. The viscosity of the make coating precursor was about 100 cps and the wet make coating weight was 10 g/m². Grade P-320 aluminum oxide was electrostatically applied into the wet make coating precursor at a weight of 42 g/m². After precuring at 60°–90° C. for about 45 minutes, a size coating precursor was applied over the precured make and mineral consisting of: 82.8% Al-3029R, 3.0% gold pigment, 6.9% water, 6.7% NH₄Cl, and 0.6% AlCl₃. The wet coating weight of the size resin was 48 g/m². This total construction was then given a cure at 50°–90° C. for about 45 minutes. Subsequently, a supersize coating was applied consisting of: 82.7% Nopco 1097A, 16.5% Vinacryl 71322, and 0.8% FC-396. The wet coating weight of the supersize resin was 22 g/m². Drying of the supersize coating was accomplished at 91° C. for one minute.

Comparative Example V was a coated abrasive having a construction known under the trade designation Grade P-320 "3M STIKIT GOLD PRODUCTION RESINBOND FRECUT FILM," available from Minnesota Mining & Manufacturing Company, St. Paul, Minn.

The articles of Example 12 and Comparative Example V were both tested via Off-Hand Abrasion Tests I and II. The results of the off-hand abrasion tests are summarized in Table 10. On Off-Hand Abrasion Test II, Example 12 showed a significant cut increase over Comparative Example V.

Example 13 and Comparative Example W

The articles of Example 13 was made in a similar manner as Example 12 on the same film backing using the same make, size, and supersize formulations, as well as identical processing conditions. The only difference was that grade P-400 aluminum oxide was electrostatically applied rather than grade P-320. For Example 13, the coating weights were:

Make Resin (wet)=10 g/m²
Grade P-400 Al₂O₃=36 g/m²
Size Resin (wet)=44 g/m²
Supersize Resin (wet)=22 g/m²

Comparative Example W was a coated abrasive having a construction know under the trade designation Grade P-400 "3M STIKIT GOLD FILM," available from Minnesota Mining & Manufacturing Company, St. Paul, Minn.

Example 13 and Comparative Example W were both tested via Off-Hand Abrasion Tests I and II. The results of the Off-Hand Abrasion Tests are summarized in Table 10. On Off-Hand Abrasion Test II, Example 13 showed a very significant cut increase over Comparative Example W.

TABLE 10

| Example No. | Off-Hand Test I (3 min) (G) | Off-Hand Test II (3 min) (G) |
|---|---|---|
| 12 | 8.6 (102%) | 16.9 (134%) |
| V | 8.4 (100%) | 12.6 (100%) |
| 13 | 6.3 (115%) | 9.1 (189%) |
| W | 5.5 (100%) | 4.8 (100%) |

This work also provided evidence that polymeric film-backed abrasive articles made with coatable binder precursor compositions can perform as well as or better than previously known polymeric film-backed abrasives. Although the above examples are intended to be representative of the invention, they are not intended to limit the scope of the appended claims.

What is claimed is:

1. A coated abrasive comprising:
   (1) a backing comprising a polymeric film, the polymeric film having a front and back surface, said front surface being primed;
   (2) an abrasive coating bonded to the front surface of the polymeric film, the abrasive coating comprising a plurality of abrasive particles dispersed in a binder, the binder comprising a cured binder precursor composition comprising a major portion of a non-solidified urea-aldehyde resin, a minor portion of a solids portion of a latex, and a cocatalyst.

2. Coated abrasive in accordance with claim 1 wherein the abrasive coating is a cured slurry, the slurry comprising said binder precursor composition and said plurality of abrasive particles, wherein said non-solidified urea-aldehyde resin has a low free aldehyde content.

3. Coated abrasive in accordance with claim 2 wherein the non-solidified urea-aldehyde resin has an aldehyde/urea molar ratio of at least about 1.0:1.0 and the free aldehyde content ranges from about 0.1 to about 3.0 weight percent based on weight of total aldehyde, and said cocatalyst consists essentially of a Lewis acid and a salt, said salt selected from the group consisting of organic amine salts and ammonium ion salts.

4. Coated abrasive in accordance with claim 1 wherein the polymeric film is a microvoided polyester film.

5. Coated abrasive in accordance with claim 1 wherein said front surface is primed via a treatment selected from the group consisting of corona, UV, electron beam, flame, and scuffing.

6. Coated abrasive in accordance with claim 1 wherein said front surface is primed with a chemical primer.

7. Coated abrasive in accordance with claim 3 wherein said Lewis acid is selected from the group consisting of aluminum chloride, iron (III) chloride, and copper (II) chloride.

8. Coated abrasive in accordance with claim 3 wherein said ammonium ion salt is ammonium chloride.

9. Coated abrasive in accordance with claim 3 wherein said organic amine salt is selected from the group of compounds having the general formula $$(X^-)^+H_3N(CH_2)_nNH_3^+(Y^-)$$

wherein X and Y are halide atoms that may be the same or different and n is an integer ranging from about 3 to about 10.

10. Coated abrasive in accordance with claim 3 wherein said Lewis acid is aluminum chloride and said ammonium ion salt is ammonium chloride.

11. Coated abrasive in accordance with claim 3 wherein said non-solidified urea-aldehyde resin has a Brookfield viscosity (#3 spindle, 30 rpm, 25 degrees centigrade) ranging from about 70 to about 900, and a percent solids ranging from about 50 to about 90 weight percent.

12. Coated abrasive in accordance with claim 3 wherein said Lewis acid and said salt are present in a weight ratio ranging from about 0.6:1 to about 0.15:1.

13. Coated abrasive in accordance with claim 3 wherein said aldehyde is formaldehyde, said aldehyde/urea molar ratio ranges from about 1.0 to about 2.0, said Lewis acid is aluminum chloride, and said ammonium ion salt is ammonium chloride.

14. Coated abrasive in accordance with claim 1 wherein said solids portion is an ethylene-vinyl acetate copolymer.

15. A coated abrasive comprising:
   (1) a backing comprising a polymeric film, the polymeric film having a front and back surface, said front surface being primed;
   (2) an abrasive coating bonded to the front surface of the polymeric film, the abrasive coating comprising:
      (a) a plurality of abrasive particles bonded to the front surface of the polymeric film by a make coating binder; and
      (b) a size coating binder overlaying the abrasive particles and the make coating binder, wherein at least the make coating binder comprises a cured make coating binder precursor composition comprising a major portion of a non-solidified urea-formaldehyde resin, a minor portion of a solids portion of a latex, and a cocatalyst.

16. Coated abrasive in accordance with claim 15 wherein the non-solidified urea-aldehyde resin has a low free aldehyde content.

17. Coated abrasive in accordance with claim 16 wherein the non-solidified urea-aldehyde resin has an aldehyde/urea molar ratio of at least about 1.0 and free aldehyde content ranging from about 0.1 to about 3.0 weight percent based on weight of total aldehyde, and said cocatalyst consists essentially of a Lewis acid and a salt, said salt selected from the group consisting of organic amine salts and ammonium ion salts.

18. Coated abrasive in accordance with claim 15 wherein the polymeric film is a microvoided polyester film.

19. Coated abrasive in accordance with claim 15 wherein said front surface is primed via a treatment selected from the group consisting of corona, UV, electron beam, flame, and scuffing.

20. Coated abrasive in accordance with claim 15 wherein said front surface is primed with a chemical primer.

21. Coated abrasive in accordance with claim 17 wherein said Lewis acid is selected from the group consisting of aluminum chloride, iron (III) chloride, and copper (II) chloride.

22. Coated abrasive in accordance with claim 17 wherein said ammonium ion salt is ammonium chloride.

23. Coated abrasive in accordance with claim 17 wherein said organic amine salt is selected from the group of compounds having the general formula $$(X^-)^+H_3N(CH_2)_nNH_3^+(Y^-)$$

wherein X and Y are halide atoms that may be the same or different and n is an integer ranging from about 3 to about 10.

24. Coated abrasive in accordance with claim 17 wherein said Lewis acid is aluminum chloride and said ammonium ion salt is ammonium chloride.

25. Coated abrasive in accordance with claim 17 wherein the non-solidified urea-aldehyde resin has a Brookfield viscosity (#3 spindle, 30 rpm, 25 degrees centigrade) ranging from about 70 to about 900, and a percent solids ranging from about 50 to about 90 weight percent.

26. Coated abrasive in accordance with claim 17 wherein said Lewis acid and said salt are present in said binder precursor composition at a weight ratio ranging from about 0.6:1 to about 0.15:1.

27. Coated abrasive in accordance with claim 17 wherein said aldehyde is formaldehyde, said aldehyde/urea ratio ranges from about 1.0 to about 2.0, said Lewis acid is aluminum chloride, and said ammonium ion salt is ammonium chloride.

28. Coated abrasive in accordance with claim 15 which includes a load-resistant supersize coating.

29. Coated abrasive in accordance with claim 15 which includes a pressure-sensitive adhesive backsize coating.

30. Coated abrasive in accordance with claim 15 which includes one member of a hook and loop type attachment adhered to the back surface of the polymeric film.

31. Coated abrasive in accordance with claim 15 wherein said solids portion is an ethylene-vinyl acetate copolymer.

32. A coated abrasive comprising:
   (1) a backing comprising a paper layer, the paper layer having a front surface and a back surface, the paper layer optionally having a latex barrier primer coating on the front surface;
   (2) an abrasive coating bonded to the front surface of the paper layer, the abrasive coating comprising a plurality of abrasive particles dispersed in a binder, the binder comprising a cured binder precursor composition comprising a major portion of a non-solidified urea-aldehyde resin having a low free aldehyde content, a minor portion of a solids portion of a latex, and a cocatalyst.

33. Coated abrasive in accordance with claim 32 wherein the front surface of the paper layer has a latex barrier primer coating on the front surface.

34. Coated abrasive in accordance with claim 32 wherein the non-solidified urea-aldehyde resin has an aldehyde/urea molar ratio of at least about 1.0 and the free aldehyde content ranges from about 0.1 to about 3.0 weight percent based on weight of total aldehyde, and said cocatalyst consists essentially of a Lewis acid and a salt, said salt selected from the group consisting of organic amine salts and ammonium ion salts.

35. Coated abrasive in accordance with claim 34 wherein said Lewis acid is selected from the group consisting of aluminum chloride, iron (III) chloride, and copper (II) chloride.

36. Coated abrasive in accordance with claim 34 wherein said ammonium ion salt is ammonium chloride.

37. Coated abrasive in accordance with claim 34 wherein said organic amine salt is selected from the group of compounds having the general formula

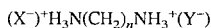

wherein X and Y are halide atoms that may be the same or different and n is an integer ranging from about 3 to about 10.

38. Coated abrasive in accordance with claim 34 wherein said Lewis acid is aluminum chloride and said ammonium ion salt is ammonium chloride.

39. Coated abrasive in accordance with claim 34 wherein said non-solidified urea-aldehyde resin has a Brookfield viscosity (#3 spindle, 30 rpm, 25 degrees centigrade) ranging from about 70 to about 900, and a percent solids ranging from about 50 to about 90 weight percent.

40. Coated abrasive in accordance with claim 34 wherein said Lewis acid and said salt are present in said non-solidified urea-aldehyde resin at a weight percent ranging from about 0.6:1 to about 0.15:1.

41. Coated abrasive in accordance with claim 34 wherein said aldehyde is formaldehyde, said aldehyde/urea ratio ranges from about 1.0 to about 2.0, said Lewis acid is aluminum chloride, and said ammonium ion salt is ammonium chloride.

42. Coated abrasive in accordance with claim 32 wherein said backing comprises a fabric nonwoven layer positioned between the paper layer and the abrasive coating, the nonwoven fabric layer adhered to the paper layer with an adhesive.

43. A coated abrasive comprising:
   (1) a backing comprising a paper layer, the paper layer having a front and back surface, the paper layer optionally having a latex barrier primer coating on the front surface;
   (2) an abrasive coating bonded to the front surface of the paper layer, the abrasive coating comprising:
      (a) a plurality of abrasive particles bonded to the front surface of the paper layer by a make coating binder; and
      (b) a size coating binder overlaying the abrasive particles and the make coating, wherein at least one of the make and size coating binders comprises a cured binder precursor composition comprising a major portion of a non-solidified urea-aldehyde resin having a low free aldehyde content, a minor portion of a solids portion of a latex, and a cocatalyst.

44. Coated abrasive in accordance with claim 43 wherein the non-solidified urea-aldehyde resin has an aldehyde/urea molar ratio of at least about 1.0 and the free aldehyde content ranges from about 0.1 to about 3.0 weight percent based on weight of total aldehyde, and said cocatalyst consists essentially of a Lewis acid and a salt, said salt selected from the group consisting of organic amine salts and ammonium ion salts.

45. Coated abrasive in accordance with claim 44 wherein said Lewis acid is selected from the group consisting of aluminum chloride, iron (III) chloride, and copper (II) chloride.

46. Coated abrasive in accordance with claim 44 wherein said ammonium ion salt is ammonium chloride.

47. Coated abrasive in accordance with claim 44 wherein said organic amine salt is selected from the group of compounds having the general formula

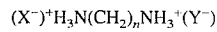

wherein X and Y are halide atoms that may be the same or different and n is an integer ranging from about 3 to about 10.

48. Coated abrasive in accordance with claim 44 wherein said Lewis acid is aluminum chloride and said ammonium ion salt is ammonium chloride.

49. Coated abrasive in accordance with claim 44 wherein said non-solidified urea-aldehyde resin has a Brookfield viscosity (#3 spindle, 30 rpm, 25 degrees centigrade) ranging from about 70 to about 900, and a percent solids ranging from about 50 to about 90 weight percent.

50. Coated abrasive in accordance with claim 44 wherein said Lewis acid and said salt are present in said binder precursor composition at a weight ratio ranging from about 0.6:1 to about 0.15:1.

51. Coated abrasive in accordance with claim 44 wherein said aldehyde is formaldehyde, said aldehyde/urea molar ratio ranges from about 1.0 to about 2.0, said Lewis acid is aluminum chloride, and said ammonium ion salt is ammonium chloride.

52. Coated abrasive in accordance with claim 43 which includes a load-resistant supersize coating.

53. Coated abrasive in accordance with claim 43 which includes a pressure-sensitive adhesive backsize coating.

54. Coated abrasive in accordance with claim 43 wherein said backing comprises a fabric nonwoven layer positioned between the paper layer and the abrasive coating, the nonwoven fabric layer adhered to the paper layer with an adhesive.

55. A nonwoven abrasive article comprising an open, lofty, three-dimensional web of fibers bonded together at a plurality of points where the fibers contact each other by a solidified urea-aldehyde binder comprising a cured binder precursor composition comprising a non-solidified urea-aldehyde resin having an aldehyde/urea molar ratio of at least about 1.0 and free aldehyde content ranging from about 0.1 to about 3.0 weight percent based on weight of total aldehyde, a solids portion of a latex, and a cocatalyst consisting essentially of a Lewis acid and a salt, said salt selected from the group consisting of organic amine salts and ammonium ion salts.

56. A method of making a polymeric film-backed coated abrasive, the method comprising the steps of:
   (1) providing a polymeric film having a front and a back surface, the film having a primer on the front surface;
   (2) providing a coatable make coating binder precursor composition comprising a major portion of a non-solidified urea-aldehyde resin, a minor portion of a solids portion of a latex, and a cocatalyst;
   (3) coating the make coating binder precursor composition onto the front surface of the polymeric film to form a wet make coated backing;
   (4) applying a plurality of abrasive particles to the wet make coated backing to form a first intermediate product;
   (5) exposing the first intermediate product of step (4) to an energy source sufficient to form an at least partially solidified make coating binder;
   (6) coating over the abrasive particles and the at least partially solidified make coating binder with a coatable size coating binder precursor composition comprising a thermosetting resin to form a second intermediate product; and
   (7) exposing the second intermediate product to an energy source sufficient to solidify the urea-aldehyde resin and the thermosetting resin.

57. Method in accordance with claim 56 wherein the coatable size coating binder precursor composition comprises a cocatalyst.

58. Method in accordance with claim 56 wherein said non-solidified urea-aldehyde is a low free aldehyde resin having an aldehyde/urea molar ratio of at least about 1.0 and a free aldehyde content ranging from about 0.1 to about 3.0 weight percent based on weight of total aldehyde, and said cocatalyst consists essentially of a Lewis acid and a salt, said salt selected from the group consisting of organic amine salts and ammonium ion salts.

59. A method of making a polymeric film-backed coated abrasive, the method comprising the steps of:

(1) providing a coatable slurry comprising abrasive particles and a binder precursor composition, the binder precursor composition comprising a major portion of a non-solidified urea-aldehyde resin, a minor portion of a solids portion of a latex, and a cocatalyst;

(2) coating the slurry onto a backing to form a wet coated backing; and (3) exposing the wet coated backing to an energy source sufficient to at least partially cure the binder precursor composition.

60. A method of making a paper-backed coated abrasive, the method comprising the steps of:

(1) providing a paper layer having a front and a back surface;

(2) providing a coatable make coating binder precursor composition comprising a major portion of a non-solidified urea-aldehyde resin, a minor portion of a solids portion of a latex, and a cocatalyst;

(3) coating the make coating binder precursor composition onto the front surface of the paper layer to form a wet make coated backing;

(4) applying a plurality of abrasive particles to the wet make coated backing to form a first intermediate product;

(5) exposing the first intermediate product of step (4) to an energy source sufficient to form an at least partially solidified make coating;

(6) coating over the abrasive particles and the at least partially solidified make coating with a coatable size coating binder precursor composition comprising a thermosetting resin to form a second intermediate product; and (7) exposing the second intermediate product to an energy source sufficient to solidify the non-solidified urea-aldehyde resin and the thermosetting resin.

61. Method in accordance with claim 60 wherein prior to coating the make coating binder precursor composition onto the front surface of the paper layer, a latex barrier primer is coated onto the front surface of the paper layer.

62. A method of making a paper-backed coated abrasive, the method comprising the steps of:

(1) providing a paper layer having a front and a back surface;

(2) providing a coatable slurry comprising abrasive particles and a binder precursor composition, the binder precursor composition comprising a major portion of a non-solidified urea-aldehyde resin having a low free aldehyde content, and a minor portion of a a solids portion of a latex, and a cocatalyst;

(3) coating the slurry onto the front surface of the paper layer to form a wet coated backing; and (4) exposing the wet coated backing to an energy source sufficient to at least partially cure the binder precursor composition.

63. Method in accordance with claim 62 wherein prior to coating the slurry onto the front surface of the paper layer, a latex barrier primer is coated onto the front surface of the paper layer.

64. Method in accordance with claim 57 wherein said thermosetting resin or both said thermosetting resin and non-solidified urea-aldehyde resin is a low free aldehyde resin having an aldehyde/urea molar ratio of at least 1.0 and a free aldehyde content ranging from about 0.1 to about 3.0 weight percent based on weight of total aldehyde, and said cocatalyst consists essentially of a Lewis acid and a salt, said salt selected from the group consisting of organic amine salts and ammonium ion salts.

* * * * *